US008510515B2

(12) United States Patent
Yamamoto et al.

(10) Patent No.: US 8,510,515 B2
(45) Date of Patent: Aug. 13, 2013

(54) STORAGE SYSTEM COMPRISING MULTIPLE STORAGE APPARATUSES WITH BOTH STORAGE VIRTUALIZATION FUNCTION AND CAPACITY VIRTUALIZATION FUNCTION

(75) Inventors: Akira Yamamoto, Sagamihara (JP); Noboru Morishita, Yokohama (JP); Hideo Saito, Yokohama (JP); Yoshiaki Eguchi, Yokohama (JP); Masayuki Yamamoto, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 287 days.

(21) Appl. No.: 13/054,389

(22) PCT Filed: Dec. 22, 2010

(86) PCT No.: PCT/JP2010/007457
§ 371 (c)(1),
(2), (4) Date: Jan. 14, 2011

(87) PCT Pub. No.: WO2012/085975
PCT Pub. Date: Jun. 28, 2012

(65) Prior Publication Data
US 2012/0166736 A1    Jun. 28, 2012

(51) Int. Cl.
*G06F 12/00* (2006.01)

(52) U.S. Cl.
USPC .......................................... 711/147; 711/165

(58) Field of Classification Search
USPC .................................................. 711/147, 165
See application file for complete search history.

(56) References Cited

U.S. PATENT DOCUMENTS

| 2004/0257857 A1 | 12/2004 | Yamamoto et al. |
| 2006/0242378 A1 | 10/2006 | Kano |
| 2007/0067593 A1 | 3/2007 | Satoyama et al. |
| 2007/0239954 A1 | 10/2007 | Sakashita et al. |
| 2009/0049241 A1 | 2/2009 | Ohno et al. |
| 2010/0131731 A1 | 5/2010 | Yamamoto et al. |
| 2010/0257333 A1 | 10/2010 | Eguchi |

FOREIGN PATENT DOCUMENTS

| EP | 1 857 918 A2 | 11/2007 |
| JP | 2003-005370 | 1/2003 |
| JP | 2004-005370 | 1/2004 |
| JP | 2007-72538 | 3/2007 |
| JP | 2007-102455 | 4/2007 |

OTHER PUBLICATIONS

International Search Report issued in International Patent Application No. PCT/JP2010/007457 dated Jul. 19, 2011.

*Primary Examiner* — John Lane
(74) *Attorney, Agent, or Firm* — McDermott Will & Emery LLP

(57) ABSTRACT

A first virtual storage and a second virtual storage share an external LU (Logical Unit) inside an external storage. The first virtual storage comprises a first LU, which comprises multiple first virtual areas and conforms to thin provisioning, and an external capacity pool, which is a storage area based on the external LU, and which is partitioned into multiple external pages, which are sub-storage areas. The second virtual storage comprises a second LU, which comprises multiple second virtual areas and conforms to thin provisioning. In a data migration from the first LU to the second LU, for a data migration from a first virtual area, to which an external page has been allocated, to a second virtual area, the first virtual storage notifies the second virtual storage of a migration-source address, which is an address of the first virtual area, and an external address, which is an address of the external page that has been allocated to this virtual area, and the second virtual storage stores a corresponding relationship between the notified migration-source address and external address.

22 Claims, 24 Drawing Sheets

INTERNAL CAPACITY POOL INFORMATION
230

STORAGE SYSTEM COMPRISING MULTIPLE STORAGE APPARATUSES WITH BOTH STORAGE VIRTUALIZATION FUNCTION AND CAPACITY VIRTUALIZATION FUNCTION

RELATED APPLICATIONS

This application is the U.S. National Phase under 35 U.S.C. §371 of International Application No. PCT/JP2010/007457, filed on Dec. 22, 2010, the disclosure of which Application is incorporated by reference herein.

TECHNICAL FIELD

The present invention relates to storage control in a storage system including multiple storage apparatuses having both a storage virtualization function and a capacity virtualization function.

BACKGROUND ART

There is a need to reduce the operating costs of a storage system that comprises multiple storage apparatuses (for example, a data center). Technology like the following has been disclosed for this type storage system.

Patent Literature 1 relates to technology called "storage virtualization". In this specification, a storage apparatus that comprises a storage virtualization function will be called a "virtual storage". Furthermore, in this specification, a storage apparatus, which is coupled to the virtual storage and comprises a storage resource that is virtualized in accordance with the virtual storage, will be called an "external storage". In the Patent Literature 1, one or more external storages are coupled to one virtual storage, and for all appearances the external storage is concealed by the virtual storage. In this specification, a logical volume, which is the access unit of a server or other such host apparatus, will be called a "LU" (LU: Logical Unit). A LU, which is mapped on a one-to-one basis to a LU on the virtual storage, is defined on the external storage. Hereinbelow, a LU, which is accessed from the server, will be called a "server LU", and a LU on the external storage will be called an "external LU". In a case where the virtual storage receives from the host apparatus an access request that specifies a server LU mapped to the external LU, this access request is processed by accessing this external LU. This technology makes it possible to reduce management costs since an administrator only needs to manage the virtual storage.

Patent Literature 2 relates to technology called "capacity virtualization". Capacity virtualization is also called thin provisioning (or dynamic provisioning). In this specification, the virtual storage also comprises a capacity virtualization function. The capacity virtualization function partitions a storage area called a "capacity pool" into segments called "pages". Generally speaking, when a LU is defined, the capacity of this LU is also specified, and a storage area corresponding to this capacity is secured in the storage apparatus. Meanwhile, in the virtual storage that has the capacity virtualization function, there is no need to secure a storage area proportional to the capacity of a virtual server LU (a server LU that conforms to thin provisioning) at the time this virtual server LU is defined. In a case where a write is actually generated to the virtual server LU, a page is allocated to the area (an area in the virtual server LU) that comprises this write destination. This makes it possible to reduce the storage area that is consumed. Furthermore, since the generation of the write triggers the allocation of the storage area, the administrator only needs to define the appropriate virtual server LU capacity, thereby making it possible to reduce management costs.

Patent Literature 3 discloses a technology that applies a capacity virtualization function to a storage area of the external storage. Since this technology can only be applied once both technologies, i.e. "storage virtualization" and "capacity virtualization", are present, it is considered to be important as a high value-added technology. In accordance with this, a large-capacity external LU, for example, is defined on the external storage. This external LU becomes one of the capacity pools on the virtual storage. The virtual storage partitions this capacity pool (the capacity pool mapped to the external LU) into multiple pages. In a case where a write is generated to the virtual server LU, the virtual storage allocates a page to the area comprising this write destination. In accordance with this, an internal page (a page in the capacity pool that is based on a physical storage device inside the virtual storage) and an external page (a page in the capacity pool mapped to the external LU) may be mixed together in the multiple pages that are allocated to the one virtual server LU.

The technologies disclosed in Patent Literatures 1 through 3 were applied in a case where the number of virtual storages was equal to or larger than one. However, linking multiple virtual storages together is also effective at further reducing operational management costs. For example, Patent Literature 4 discloses a technology for linking two virtual storages and backing up both storages. Furthermore, Patent Literature 4 also discloses a technology, which, in an environment in which multiple virtual storages share the external storage, migrates authority to access the external LU on the external storage from a certain virtual storage to a different virtual storage without copying the data of the relevant LU for the purpose of load leveling.

CITATION LIST

Patent Literature

[PTL 1]
Japanese Patent Application Laid-open No. 2004-005370
[PTL 2]
Japanese Patent Application Laid-open No. 2003-005370
[PTL 3]
Japanese Patent Application Laid-open No. 2007-102455
[PTL 4]
Japanese Patent Application Laid-open No. 2007-072538

SUMMARY OF INVENTION

Technical Problem

A storage system, which comprises multiple virtual storages and one or more external storages, and in which the multiple virtual storages (for example, virtual storage A and virtual storage B) share the external storage, will be considered. Then, moving a virtual server LU access authority to which a page in the capacity pool is allocated, which corresponds to the external LU defined on the virtual storage A, from the virtual storage A to the virtual storage B will be considered.

The present invention aims at solving the problem that occurs when technology like that disclosed in Patent Literature 3 (technology that applies a capacity virtualization function to a storage area of the external storage) has been applied to technology for linking multiple virtual storages, and is highly important.

The primary triggers for moving the access authority of the virtual server LU, for example, are as follows:
(1) Load leveling between virtual storage A and virtual storage B; and
(2) moving data from an existing virtual storage A, which is old, to a new virtual storage B.

In the above (2), in a case where the virtual storage A is to be discarded, all of the virtual storage A access authorities to the virtual server LU are migrated to other virtual storages including the virtual storage B.

In a case where the external storage is shared between the virtual storage A and the virtual storage B, the external LU access authority, which the virtual storage A has as an access authority, can be migrated from the virtual storage A to the virtual storage B in accordance with the technology disclosed in Patent Literature 4 since virtual storage B is able to access the external storage.

However, when the access authority for the external LU, which corresponds to the capacity pool, is also migrated from the virtual storage A to the virtual storage B in addition to the virtual server LU access authority, there is a possibility that the virtual server LU to which the virtual storage A has the access authority and the virtual server LU to which the virtual storage B has the access authority will be intermixed as multiple virtual server LUs that are associated with this capacity pool. Solving such a problem has not been considered in the past.

Solution to Problem

To solve this problem, in the present invention, the allocation/release authority for the capacity pool corresponding to the external LU and the access authority with respect to the virtual server LU (hereinafter simply called the "LU") are provided independently.

In the present invention, when a LU (a LU access authority) is migrated from a virtual storage A to a virtual storage B in a storage system that comprises the virtual storages A and B, and an external storage (an external storage-provided external LU) that these virtual storages A and B share, the following determinations (a) and (b) are carried out for each area comprising this LU (hereinafter, the LU area):
(a) whether or not a page has been allocated to this LU area; and
(b) in a case where a page has been allocated to this LU area, whether this page is a page in a capacity pool based on a physical storage device of the virtual storage A or a page in a capacity pool corresponding to the external LU of the external storage, with processing being executed in accordance with the result of this determination. Specifically, this is as described hereinbelow. The processing carried out in a LU migration process will be explained below using one LU area (hereinafter, the target LU area) as an example.
(1) Case in which page has not been allocated to target LU area
(1a) The virtual storage A sends to the virtual storage B information denoting the address of the target LU area and the fact that a page has not been allocated to this area.
(1b) The virtual storage B stores the information (information denoting the address of the target LU area and the fact that a page has not been allocated to this area) received from the virtual storage A.
(2) Case in which page in capacity pool corresponding to external LU (hereinafter external page) allocated to target LU area
(2a) The virtual storage A sends to the virtual storage B information denoting the target LU area address and the address of the external page allocated to this area.
(2b) The virtual storage B stores the information (information denoting the target LU area address and the address of the external page allocated to this area) received from the virtual storage A.

This is one characteristic feature of the present invention. In accordance with this, instead of copying data of the page that is allocated to the target LU area, a notification may simply be issued with respect to the address of the external page allocated to the target LU area (substantially, the address of the area in the external LU). This makes it possible to migrate an access authority efficiently. Furthermore, in this case, the virtual storage B, upon receiving a read/write request specifying the migration-destination LU from the host, accesses the external LU area (the LU area in the external LU) that conforms to the external page address notified from the virtual storage A in a case where the address (the LU area address in the migration-destination LU) specified in this read/write request is an address that conforms to the target LU area address notified from the virtual storage A.
(3) Case in which page in capacity pool based on physical storage device of virtual storage A (hereinafter internal page) allocated to target LU area
(3a) The virtual storage A sends to the virtual storage B information denoting the target LU area address and the address of the internal page allocated to this area.
(3b) The virtual storage A sends to the virtual storage B data inside the internal page allocated to the target LU area.
(3c) The virtual storage B secures a page in a capacity pool based on a physical storage device of the virtual storage B.
(3d) The virtual storage B stores the data received from the virtual storage A in the page secured in the above-mentioned (3c).

The trigger for migrating the LU access authority may be either before or after the processing of the above-mentioned (1) through (3).

In the present invention, in principle, even though the LU access authority is migrated from the virtual storage A to the virtual storage B, the virtual storage A retains the allocation/release authority for the capacity pool (hereinafter the capacity pool A) that is associated with this LU in the virtual storage A. For this reason, in the virtual storage B, in a case where the allocation/release of a page of the capacity pool A becomes necessary in the area of the LU migrated to the virtual storage B, the virtual storage B requests that the virtual storage A carry out page allocation/release processing.

Furthermore, for example, in the case of either (X) or (Y) below, the page allocation/release authority for the capacity pool A may also be migrated to the virtual storage B.
(X) A case in which one or more LU access authorities, which are allocated by a page that is equal to or greater than a prescribed percentage of the capacity pool A, are migrated to the virtual storage B.
(Y) A case in which the load of the virtual storage A (for example, the CPU usage) is equal to or greater than a prescribed load. For example, a case in which the load on the virtual storage A with respect to allocating/releasing a page of the capacity pool A is equal to or greater than a prescribed load.

Advantageous Effects of Invention

According to the present invention, in a case where a LU access authority allocated by a page in a capacity pool (a capacity pool inside a virtual storage A) corresponding to an external LU is migrated from the virtual storage A to the virtual storage B in a storage system that comprises the virtual storages A and B, and an external storage that these virtual storages A and B share, the access authority for an external page allocated to this LU can be migrated by simply notifying the virtual storage B of the address of this external page instead of copying the data inside this external page. This makes it possible to migrate the access authority highly efficiently.

DESCRIPTION OF EMBODIMENTS

Figure 1:
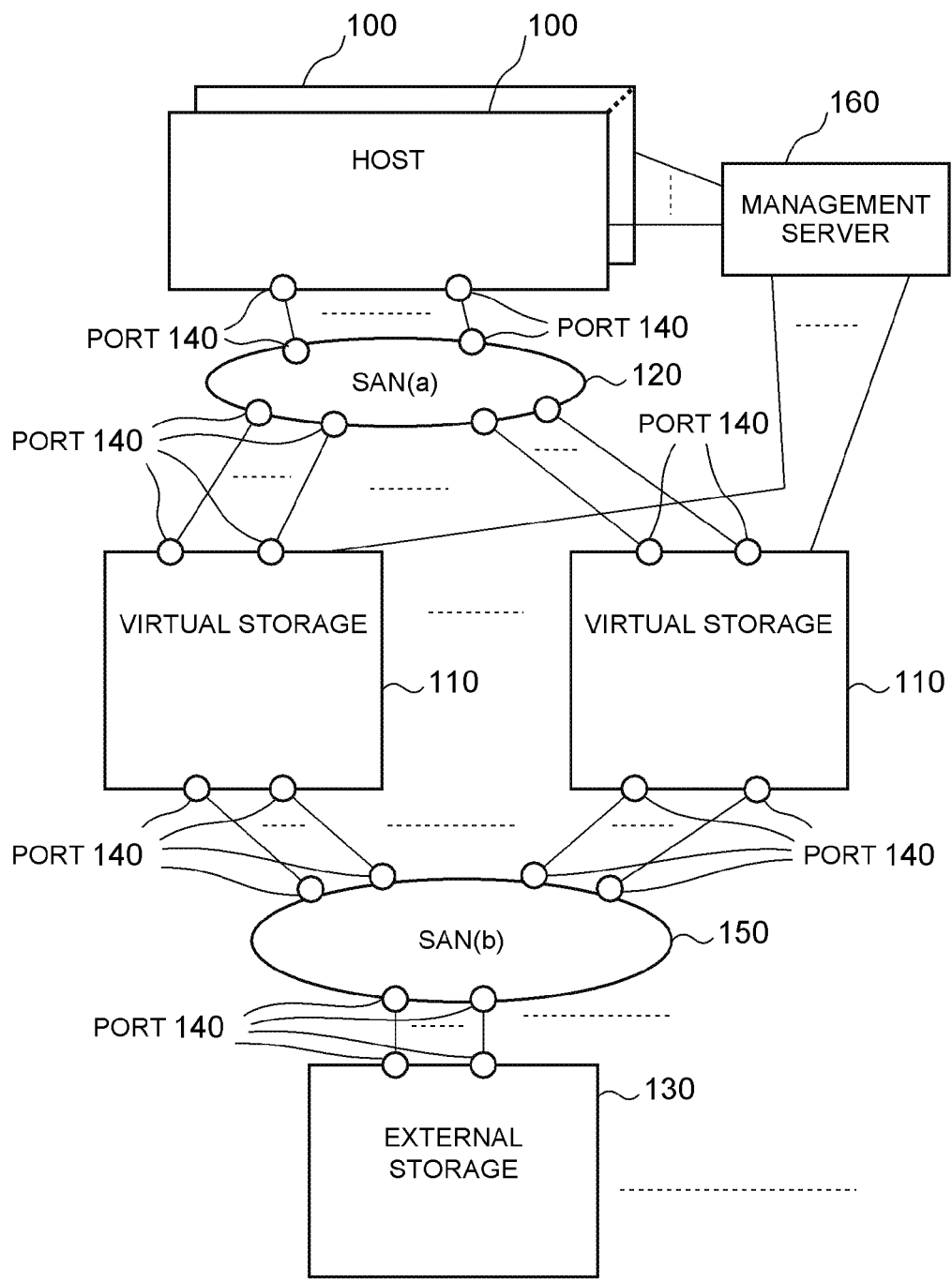
FIG. 1 shows an example of the configuration of an IT (Information Technology) system related to Embodiment 1.

A number of embodiments of the present invention will be explained below by referring to the drawings.

Embodiment 1

FIG. 1 shows an example of the configuration of an IT (Information Technology) system related to Embodiment 1 of the present invention.

A host 100 is a computer in which an application is executed, and there are one or more hosts 100.

A virtual storage 110 is a storage apparatus that comprises both a storage virtualization function and a capacity virtualization function. The virtual storage 110 is coupled to the host 100, and receives a read/write request (either a read request or a write request) from the host 100. Also, there are two or more virtual storages 110. The IT system may comprise a storage apparatus that does not comprise at least one of the storage virtualization function and the capacity virtualization function. For example, this kind of storage apparatus can be used as an external storage 130, which is shared by multiple virtual storages 110.

According to FIG. 1, the virtual storage 110 is coupled to the host 100 via a SAN (a) 120. Similarly, the virtual storages 110 are also coupled via the SAN (a) 120. However, the virtual storage 110 may be coupled directly to the host 100 (may be coupled without going through the SAN (a)), and the virtual storages 110 may also be coupled directly (may be coupled without going through the SAN (a)). Furthermore, one virtual storage 110 is coupled to at least one host 100 and at least one virtual storage 110. The respective connections of the host 100, the virtual storage 110 and the SAN (a) 120 are called "ports" 140. The host 100 and the virtual storage 110 have at least one port 140, and the SAN (a) 120 has at least two ports 140. The host 100 specifies a LU identifier (for example, a LUN (Logical Unit Number)), a relative address in the LU (for example, a LBA (Logical Block Address)), and a data length in the read/write request issued to the virtual storage 110. The host 100-specified LU will be called the "host LU" hereinafter.

The external storage 130 is coupled to the virtual storage 110 via a SAN (b) 150. As a rule, the external storage 130 does not receive a read/write request directly from the host 100, but rather receives this request via the virtual storage 110. There may be exceptions, and such exceptional cases will be explained further below. The external storage 130 is coupled to at least two virtual storages 110. A LU defined on the external storage 130 will be called an "external LU". Basically, the external LU is accessed from the virtual storage 110.

A management server 160 is for managing the host 100 and the virtual storage 110, and is coupled to the host 100 and the virtual storage 110. In Embodiments 1 and 2, the management server 160 collects information such as the frequency of read/write requests with respect to the virtual storage 110, and decides on the migration of the host LU between the virtual storages 110. Furthermore, in Embodiments 3 and 4, the management server 160 oversees control so that a new virtual storage 110 is coupled to the SAN (a) 120, all the data of an old virtual storage 110 is moved to the new virtual storage 110, and the old virtual storage 110 is done away with. Furthermore, an apparatus other than the management server 160 (for example, the host 100 or the virtual storage 110 (that is the migration source or the virtual storage 110 that is the migration destination of the host LU)) may comprise the functions of the management server 160 in any of the embodiments.

Figure 2:
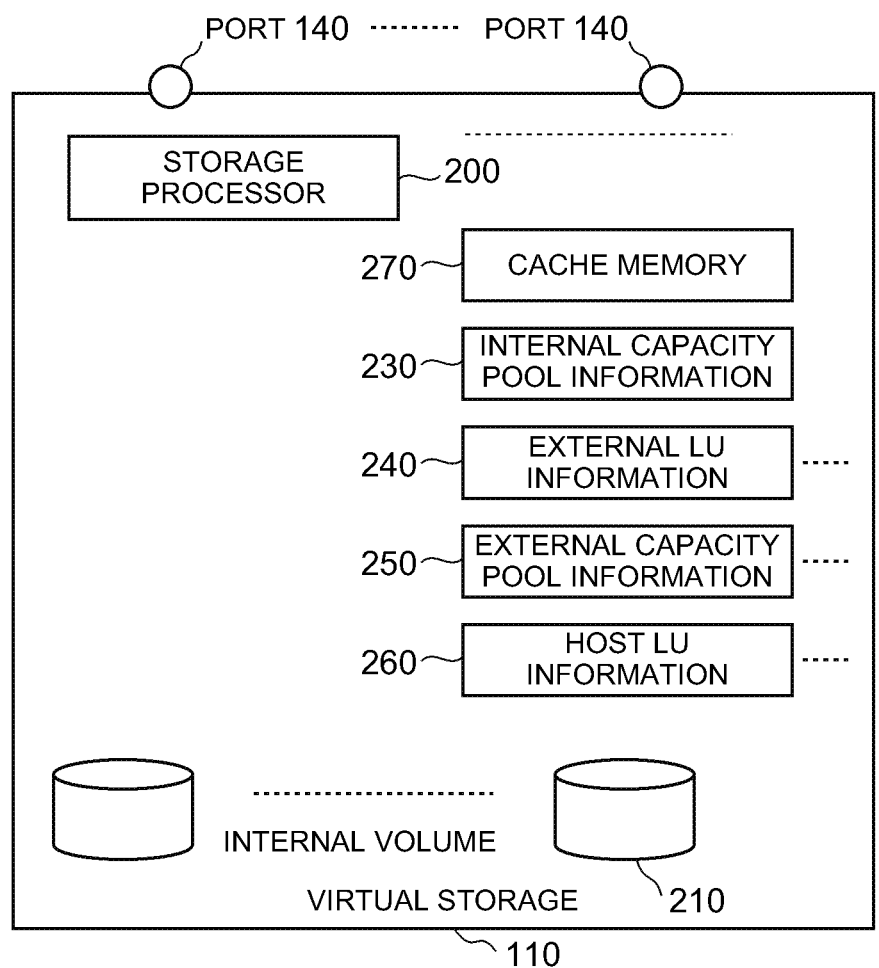
FIG. 2 shows an example of the configuration of a virtual storage related to Embodiment 1.

FIG. 2 shows an example of the configuration of the virtual storage 110.

The virtual storage 110 comprises multiple physical storage devices (for example, either HDDs (Hard Disk Drives) or a SSDs (Solid State Drives)) and a controller that is coupled to the multiple physical storage devices.

Multiple logical volumes 210 are built based on the multiple physical storage devices. Hereinafter, a logical volume 210 based on a physical storage device in the virtual storage 110 will be called an "internal volume 210". The internal volume 210 may be based on a RAID (Redundant Array of Independent Disks) group, which comprises two or more physical storage devices. A storage processor 200 manages the RAID configuration.

The controller is an apparatus for controlling the operation of the virtual storage 110. The controller comprises multiple ports 140, a storage resource comprising a cache memory 270, and a storage processor (for example, a CPU (Central Processing Unit)) 200 that is coupled to these components. The storage resource stores internal capacity pool information 230, external LU information 240, external capacity pool information 250, and host LU information 260. Furthermore, the storage resource stores one or more computer programs that are executed by the storage processor 200.

One or more storage processors 200 are included inside the virtual storage 110, and these processors 200 process read/write requests received from the host 100.

The internal capacity pool information 230 is related to the internal capacity pool. The "internal capacity pool" is a capacity pool based on a physical storage device in the virtual storage 110, and comprises one or more internal volumes 210. The internal capacity pool is partitioned into multiple pages (hereinafter internal pages).

The external LU information 240 is related to an external LU defined in the external storage 130 coupled to the virtual storage 110. The external LU information 240 may exist for all the external LUs on all the external storages 130 coupled to the virtual storage 110, or the external LU information 240 may exist only for a portion of the external LUs.

The external capacity pool information 250 is related to an external capacity pool. The "external capacity pool" comprises a virtual logical volume (a logical volume that conforms to the storage virtualization function) to which one or more external LUs are mapped. The external capacity pool is partitioned into multiple pages (hereinafter external pages). Data that has an external page as the write destination is actually written to a LU area inside the external LU that serves as the base of this external page.

The host LU information 260 is related to the host LU.

The cache memory 270 stores data that the host 100 reads/writes from/to the host LU. The memory 270 is ordinarily a semiconductor memory, but may be made nonvolatile using a battery, and may be duplexed to heighten reliability.

Figure 3:
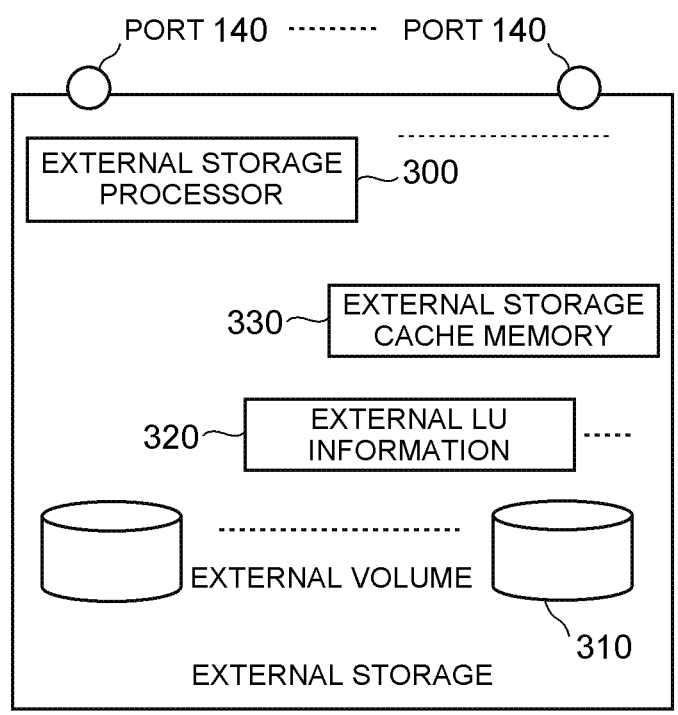
FIG. 3 shows an example of the configuration of an external storage related to Embodiment 1.

FIG. 3 shows an example of the configuration of the external storage 130.

The external storage 130 comprises multiple physical storage devices (for example, HDDs (Hard Disk Drives) or SSDs (Solid State Drives)), and a controller that is coupled to the multiple physical storage devices.

Multiple logical volumes 310 are built having the multiple physical storage devices as a base. Hereinafter, a logical volume 310 based on a physical storage device inside the external storage 130 will be called an "external volume 310". The external volume 310 may be based on a RAID group that comprises two or more physical storage devices. The management of the RAID configuration is carried out by an external storage processor 300. A capacity pool is configured from one or more external volumes 310, and a virtual LU that conforms to thin provisioning may be disposed in this capacity pool. Either the external volume 310 or a virtual LU associated with the capacity pool comprising one or more external volumes 310 may be an external LU.

The controller is an apparatus for controlling the operation of the external storage 130. The controller comprises multiple ports 140, a storage resource comprising an external cache memory 330, and an external storage processor (for example, a CPU) 300 that is coupled to these components. The storage resource stores external LU information 320. Furthermore, the storage resource stores one or more computer programs that are executed by the external storage processor 300.

One or more external storage processors 300 are included inside the external storage 130, and these processors 300 process read/write requests received from the host 100.

The external LU information 320 is related to the external LU. The external storage cache memory 330 is for storing data that the external storage reads/write from/to the external LU. The memory 330 is ordinarily a semiconductor memory, but may be made nonvolatile using a battery, and may be duplexed to heighten reliability.

Various types of information will be explained hereinbelow. In so doing, in a case where no particular distinction is made between an internal capacity pool and an external capacity pool, it will simply be called a "capacity pool", and in a case where no particular distinction is made between an internal page and an external page, it will simply be called a "page".

Figure 4:
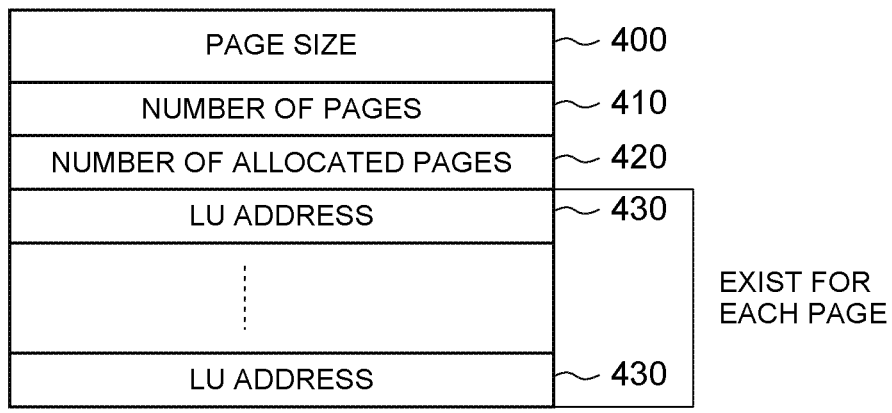
FIG. 4 shows an example of the format of internal capacity pool information related to Embodiment 1.

FIG. 4 shows an example of the format of the internal capacity pool information 230.

The internal capacity pool information 230 exists in each internal capacity pool. The internal capacity pool information 230 comprises a page size 400, a number of pages 410, a number of allocated pages 420, and a LU address 430. A LU address 430 exists for each internal page. Information elements inside this information 230 will be explained below by giving a single internal capacity pool (will be called the "target pool" in the explanation of FIG. 4) as an example.

The page size 400 is information denoting the size of an internal page.

The number of pages 410 denotes the number of internal pages of the target pool (a value obtained by dividing the capacity of the target pool by the page size 400).

The number of allocated pages 420 denotes the number of allocated internal pages inside the target pool.

The LU address 430 is information denoting the allocation-destination area of an internal page (for example, the LUN of a host LU, and the relative address of this host LU (for example, the LBA)). It is supposed that a NULL value is stored as the LU address 430 corresponding to an internal page that has not been allocated to the host LU.

Figure 5:
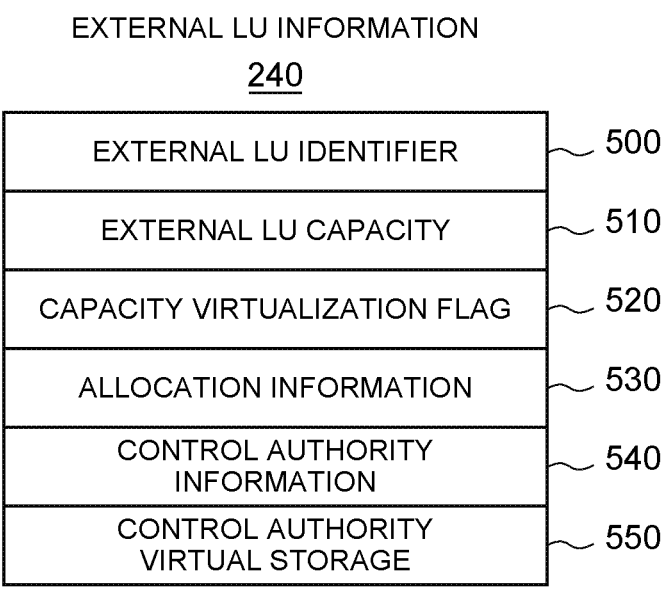
FIG. 5 shows an example of the format of external LU information related to Embodiment 1.

FIG. 5 shows an example of the format of the external LU information 240.

The external LU information 240 exists for each external LU. The external LU information 240 comprises an external LU identifier 500, an external LU capacity 510, a capacity virtualization flag 520, allocation information 530, control authority information 540, and a control authority virtual storage 550. The information elements inside this information 240 will be explained below by giving a singe external LU (will be called the "target external LU" in the explanation of FIG. 5) as an example.

The external LU identifier 500 is information comprising the LUN of the target external LU, and the identifier of the external storage 130 comprising the target external LU.

The external LU capacity 510 is information denoting the capacity of the target external LU.

The capacity virtualization flag 520 is information denoting whether or not a capacity virtualization function is applied in the target external LU. In a case where a capacity virtualization function is not being applied, the target external LU and the host LU inside the virtual storage 110 basically correspond to one another on a one-to-one basis. There may also be cases in which the host LU is not mapped to the target external LU. In a case where the capacity virtualization function is being applied, the target external LU corresponds to the external capacity pool on a one-to-one basis.

The allocation information 530 denotes the identifier of the external capacity pool corresponding to the target external LU in a case where the capacity virtualization function is being applied to the target external LU. In a case where the capacity virtualization function is not being applied to the target external LU, the identifier of the host LU mapped to the target external LU is stored. In a case where the host LU is not mapped to the target external LU, a NULL value is stored as the allocation information 530.

The control authority information 540 denotes whether or not the virtual storage 110 comprising this external LU information 240 has the control authority (the external page allocation/release authority) for the external capacity pool corresponding to the target external LU. In a case where this virtual storage 110 has the target external LU control authority, a value denoting ON is stored as the control authority information 540. Specifically, for example, in a case where the capacity virtualization function is being applied to the target external LU, this virtual storage 110 possess the allocation/release authority for the external page in the external capacity pool corresponding to the target external LU. Furthermore, in a case where the capacity virtualization function is not being applied to the target external LU, this virtual storage 110 also has the authority for read/write processing with respect to the host LU mapped to the target external LU.

The control authority virtual storage 550 is the identifier of the virtual storage 110 that has the control authority for the target external LU.

Figure 6:
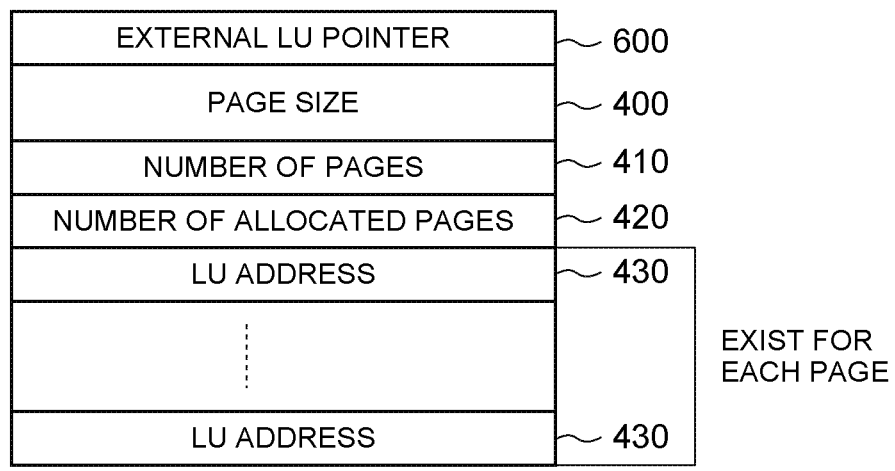
FIG. 6 shows an example of the format of external capacity pool information related to Embodiment 1.

FIG. 6 shows an example of the format of the external capacity pool information 250.

The external capacity pool information 250 exists for each external capacity pool. The external capacity pool information 250 comprises an external LU pointer 600, a page size 400, a number of pages 410, a number of allocated pages 420, and a LU address 430. A LU address 430 exists for each external page. The information elements in this information 250 will be explained below by giving a single external capacity pool (will be called the "target pool" in the explanation of FIG. 6) as an example.

The external LU pointer 600 points to the external LU information 240 of the external LU corresponding to the target pool.

The rest of the information is substantially the same as the information elements included in the internal capacity pool information 230. That is, the page size 400 is information denoting the size of the external page. The number of pages 410 denotes the number of external pages of the target pool. The number of allocated pages 420 denotes the number of allocated external pages inside the target pool. The LU address 430 is information denoting the allocation-destination area of an external page (for example, the LUN of a host LU and the relative address of this host LU (for example, the LBA)).

Figure 7:
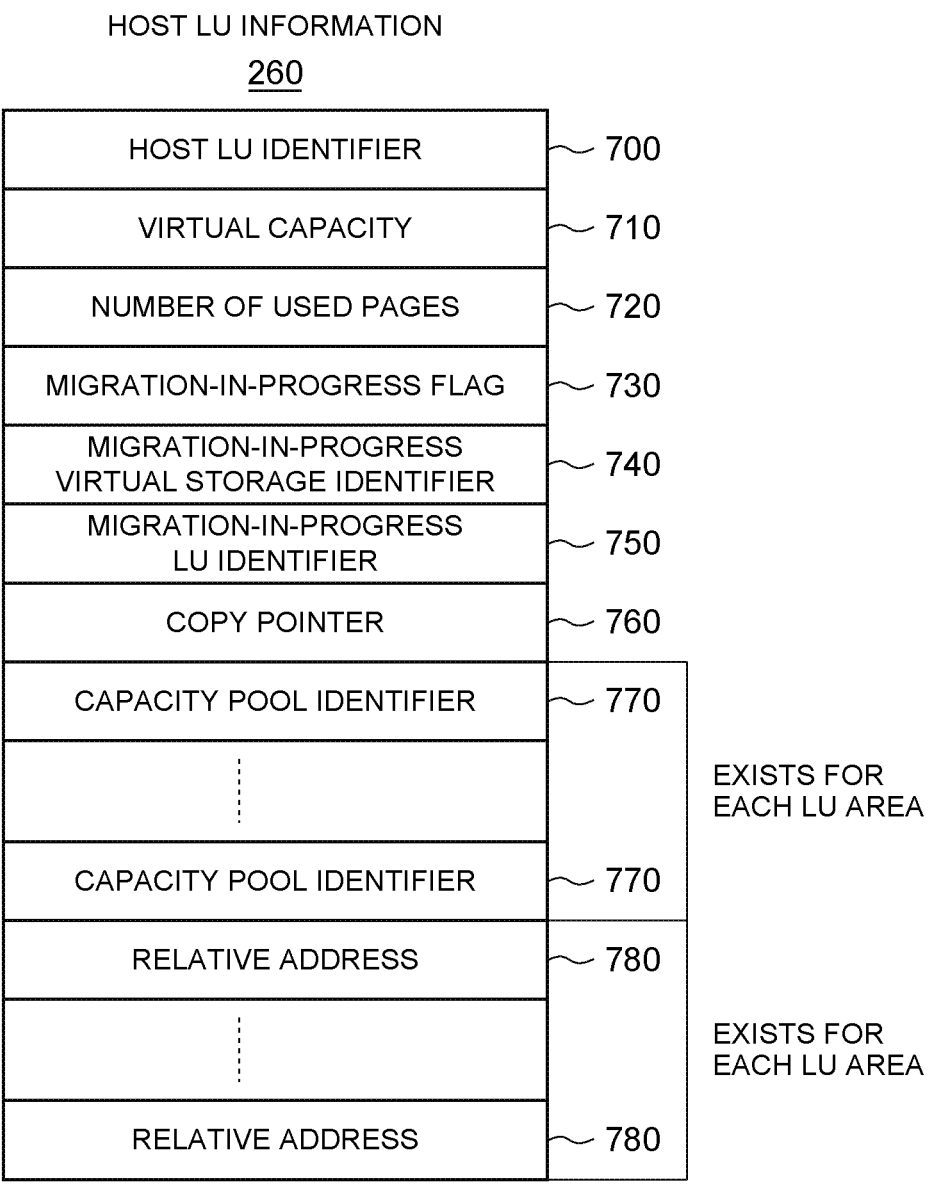
FIG. 7 shows an example of the format of host LU information related to Embodiment 1.

FIG. 7 shows an example of the format of the host LU information 260. Furthermore, in Embodiment 1, it is supposed that the capacity virtualization function is applied to all the host LUs in the virtual storage 110. However, the present invention is effective even when the capacity virtualization function is only applied to a portion of the host LUs in the virtual storage 110.

The host LU information 260 exists for each host LU. The host LU information 260 comprises a host LU identifier 700, a virtual capacity 710, a number of used pages 720, a migration-in-progress flag 730, a migration-in-progress virtual storage identifier 740, a migration-in-progress LU identifier 750, a copy pointer 760, a capacity pool identifier 770, and a relative address 780. The capacity pool identifier 770 and the relative address 780 exist for each LU area comprising the host LU. A single internal page or external page is allocated to the LU area. Therefore, the number of LU areas comprising the host LU in Embodiment 1 will be the same as the value obtained by dividing the virtual capacity 700, which will be described further below, by the page size 400. Furthermore, multiple pages (internal pages and/or external pages) may be allocated to a single LU area. The information elements of this information 260 will be explained below by giving a single host LU (will be called the "target host LU" in the explanation of FIG. 7) as an example.

The host LU identifier 700 is the identifier (for example, the LUN) of the target host LU.

The virtual capacity 710 is information denoting the virtual capacity of the target host LU.

The number of used pages 720 is information denoting the number of pages that have been allocated to the target host LU.

The migration-in-progress flag 730 denotes whether or not the target host LU is in the process of being migrated to another virtual storage.

The migration-in-progress virtual storage identifier 740 is the identifier of the virtual storage 110 (the migration-source virtual storage 110) that will migrate the target host LU.

The migration-in-progress LU identifier 750 is the identifier (for example, the LUN) of the host LU in the migration-source virtual storage 110.

The copy pointer 760 shows the address of the LU area for which migration has been completed. In Embodiment 1, for example, migration processing is carried out in order from the first LU area of the target host LU to the last LU area. The copy pointer 760 shows the LU area up to which migration processing has been completed.

The capacity pool identifier 770 is the identifier of the capacity pool comprising the page that has been allocated to the LU area.

The relative address 780 denotes the relative address in the capacity pool of the page that has been allocated to the LU area. In a case where a page has not been allocated, both the capacity pool identifier 770 and the relative address 780 are NULL values.

Figure 8:
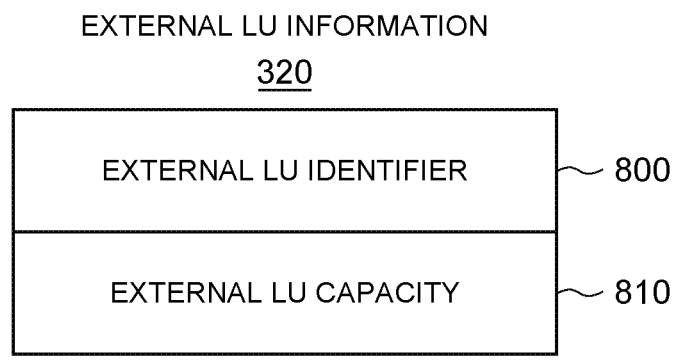
FIG. 8 shows an example of the format of external LU information related to Embodiment 1.

FIG. 8 shows an example of the format of the external LU information 320.

The external LU information 320 exists for each external LU. The external LU information 320 comprises an external LU identifier 800 and an external LU capacity 810. The information elements of this information 320 will be explained below by giving a single external LU (will be called the "target external LU" in the explanation of FIG. 8) as an example.

The external LU identifier 800 is the identifier (for example, a LUN) of the target external LU in the external storage 130.

The external LU capacity 810 is information denoting the capacity of the target external LU.

The preceding has been an explanation of the various type of information. Furthermore, the explanations carried out by referring to FIGS. 1 through 8 are shared in common with the Embodiment 1 through Embodiment 4.

Figure 9:
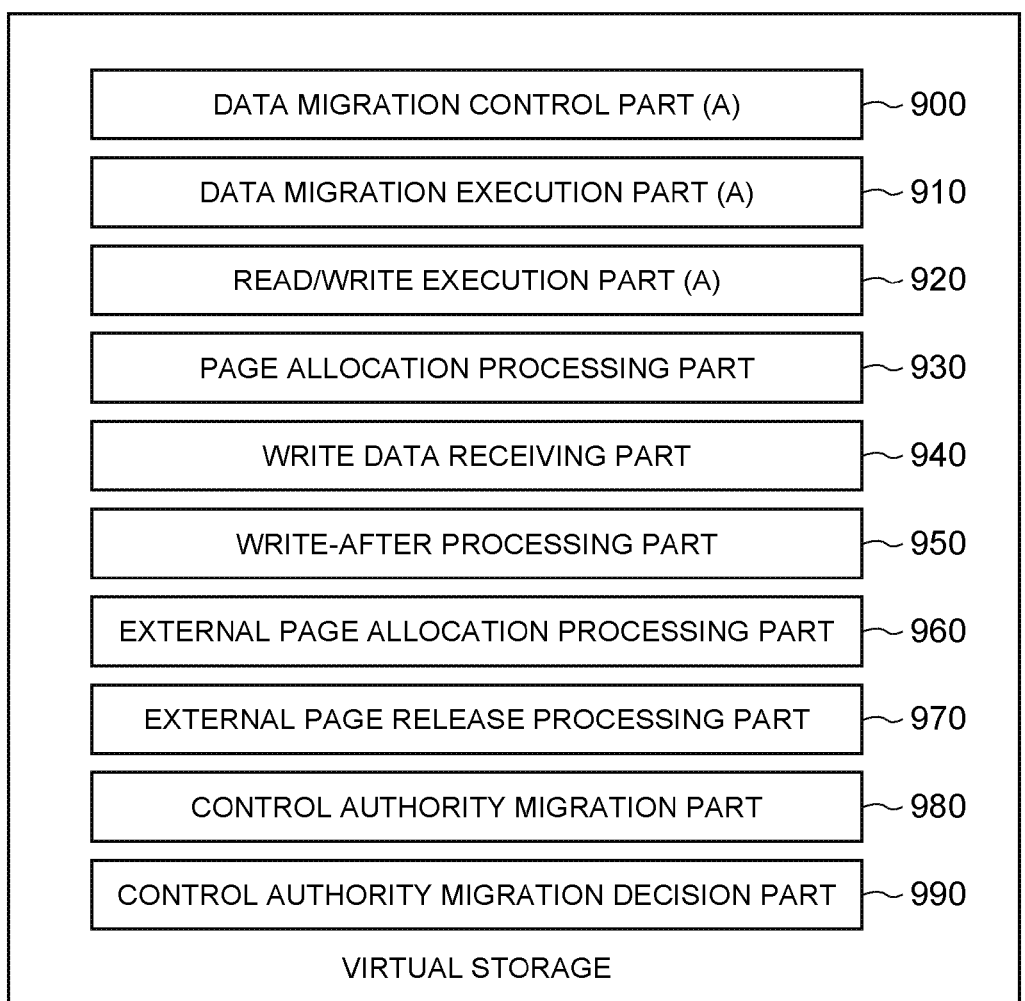
FIG. 9 shows an example of multiple functions realized by a virtual storage 110 related to Embodiment 1.

FIG. 9 shows one example of multiple functions realized by the virtual storage 110 related to Embodiment 1.

In Embodiment 1, the following multiple functions, that is, a data migration control part (a) 900, a data migration execution part (a) 910, a read/write execution part (a) 920, a page allocation processing part 930, a write data receiving part 940, a write-after processing part 950, an external page allocation processing part 960, an external page release processing part 970, a control authority migration part 980, and a control authority migration decision part 990, are realized in accordance with the storage processor 200 executing one or more computer programs inside the virtual storage 110. At least a portion of the processing executed in accordance with these functions may be executed using a hardware circuit.

In Embodiment 1, when the host LU is migrated from the migration-source virtual storage 110 to the migration-destination virtual storage 110, the migration-source virtual storage 110 executes the control over the migration process. During the migration process, the host 100 is able to issue a read/write request to the migration-source virtual storage 110.

In this example, the management server 160 checks the load of the respective virtual storages 110, and decides on the virtual storage 110 host LU to be migrated and the virtual storage 110 that will become the migration destination. In this example, it is supposed that the identifier of the migration-source host LU is not passed to the migration-destination host LU, but the present invention is effective even in a case where an identifier like a World Wide Name defined by the fibre channel protocol is inherited. The management server 160 sends the migration-source host LU identifier, the migration-destination virtual storage 110 identifier, and the migration-destination host LU identifier to the migration-source virtual storage 110. Furthermore, the management server 160 sends the migration-source virtual storage 110 identifier, the migration-source LU identifier, the migration-destination host LU identifier, and information denoting the virtual capacity of this host LU to the migration-destination virtual storage 110.

Figure 10:
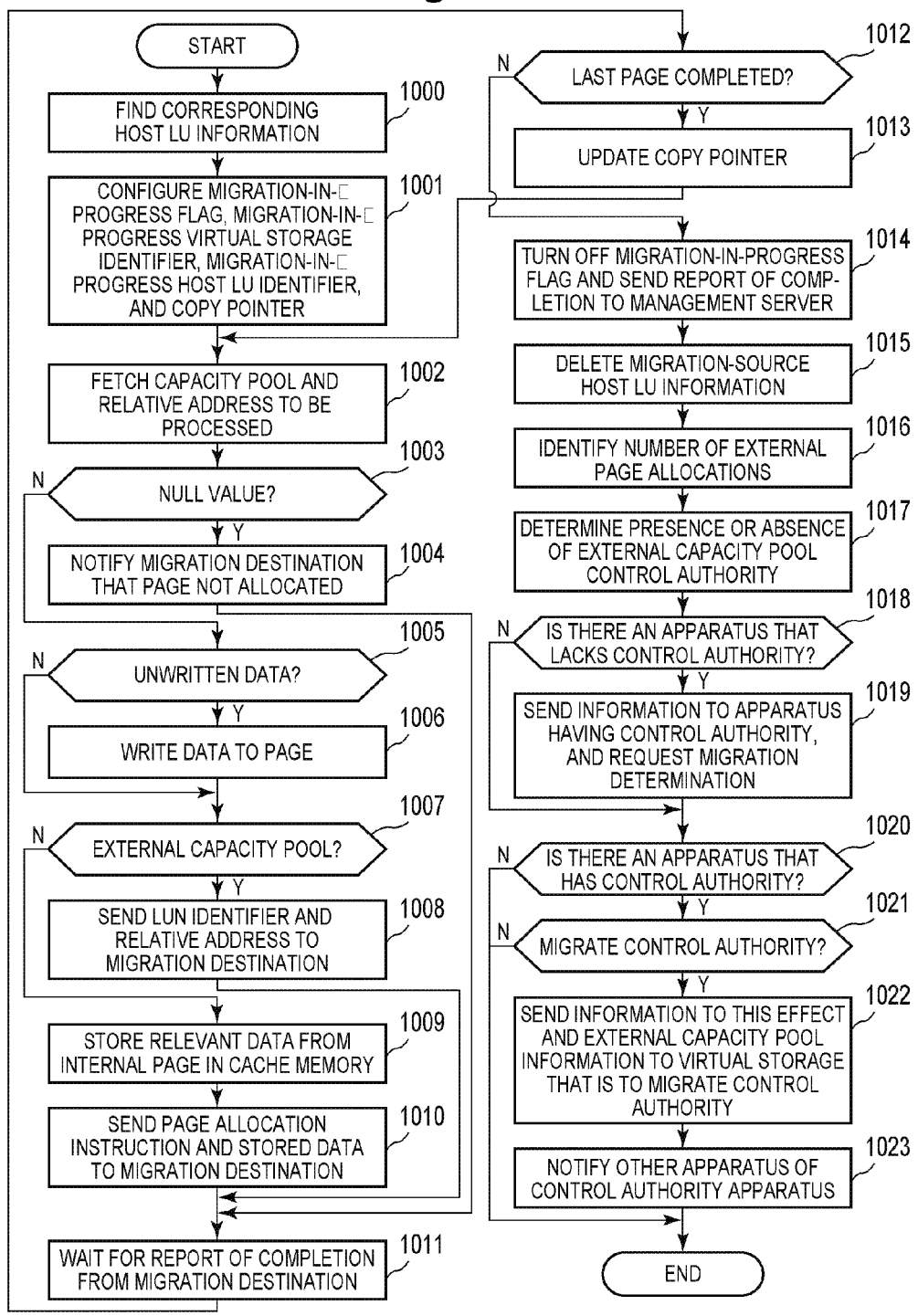
FIG. 10 shows an example of the flow of processing of a data migration control part (a) in a migration-source virtual storage related to Embodiment 1.

In Embodiment 1, the data migration control part (a) 900 of the migration-source virtual storage 110 receives a LU migration request from the management server 160, and after responding to the management server 160 to the effect that this request has been received, executes the flow of processing shown in FIG. 10.

FIG. 10 shows one example of the flow of processing of the data migration control part (a) 900 in the migration-source virtual storage 110.

In Step 1000, the data migration control part (a) 900 finds the host LU information 260 corresponding to the migration-source host LU identifier.

In Step 1001, the data migration control part (a) 900 changes the value of the migration-in-progress flag 730 in the host LU information 260 (the "target information 260" in the explanation of FIG. 10) that was found in Step 1000 to the value denoting "ON". In addition, the data migration control part (a) 900 configures the migration-destination virtual storage 110 identifier and the migration-destination LU identifier received from the management server 160 as the migration-in-progress virtual storage identifier 740 and the migration-in-progress host LU identifier 750 in the target information 260. In addition, the data migration control part (a) 900 configures information denoting the first LU area in the migration-source LU as the copy pointer 760 in the target information 260.

In Step 1002, the data migration control part (a) 900 identifies from the target information 260 the capacity pool identifier 770 and the relative address 780 corresponding to the LU area (the "target migration-source area" in the explanation of FIG. 10) shown by the copy pointer 750 in the target information 260.

In Step 1003, the data migration control part (a) 900 determines whether or not the values of the identifier 770 and the address 780 identified in the Step 1002, are NULL.

In a case where the result of the determination of Step 1003 is affirmative (Step 1003: Y), in Step 1004, the data migration control part (a) 900 notifies the migration-destination virtual storage 110 that a page has not been allocated to the target migration-source area. Thereafter, the processing jumps to Step 1011.

In a case where the result of the determination of Step 1003 is negative (Step 1003: N), in Step 1005, the data migration control part (a) 900 determines whether the page that has been allocated to the target migration-source area is the write destination, and whether data, which has not been written to this page yet, is in the cache memory 270.

In a case where the result of the determination of Step 1005 is affirmative (Step 1005: Y), in Step 1006, the data migration control part (a) 900 writes this data to the page (either an internal page or an external page) allocated to the target migration-source area. In a case where an external page is the write destination, the data migration control part (a) 900 writes the data to the external LU area corresponding to this external page (the LU area in the external LU inside the external storage 130).

In Step 1007, the data migration control part (a) 900 determines whether or not the capacity pool identifier 770 corresponding to the target migration-source area in the target information 260 is the identifier of the external capacity pool.

In a case where the result of the determination of Step 1007 is affirmative (Step 1007: Y), in Step 1008, the data migration control part (a) 900 identifies the external capacity pool information 250 (the "target external capacity pool information 250" in FIG. 10) corresponding to the capacity pool identifier 770 (the external capacity pool identifier) that corresponds to the target migration-source area. The data migration control part (a) 900 identifies, based on the target external capacity pool information 250, the relative address of the external LU area corresponding to the external page allocated to the target migration-source area (a relative address in the external LU) and the identifier of the external LU comprising this external LU area, and sends this information to the migration-destination virtual storage 110. Thereafter, the processing jumps to Step 1011.

In a case where the result of the determination of Step 1007 is negative (Step 1007: N), in Step 1009, the data migration control part (a) 900 reads data from the internal page allocated to the target migration-source area, and stores this data in the cache memory 270.

In Step 1010, the data migration control part (a) 900 sends the relative address of the target migration-source area, the fact that an internal page in the migration-destination virtual storage 110 must be allocated to the target migration-source area, and the data stored in the cache memory 270 in Step 1009 to the migration-destination virtual storage 110.

In Step 1011, the data migration control part (a) 900 waits for a report of completion from the migration-destination virtual storage 110.

In Step 1012, the data migration control part (a) 900 determines whether or not the processing with respect to the last LU area of the migration-source LU has been completed.

In a case where the result of the determination of Step 1012 is negative (Step 1012: N), in Step 1013, the data migration control part (a) 900 configures information denoting the next LU area as the copy pointer 750 in the host LU information 260 corresponding to the migration-source host LU, and jumps to Step 1002.

In a case where the result of the determination of Step 1012 is affirmative (Step 1012: Y), in Step 1014, the data migration control part (a) 900 changes the value of the migration-in-progress flag 730 in the target host LU information 260 to a value denoting OFF. Then the data migration control part (a) 900 reports the completion of the migration process to the management server 160 and waits for the next instruction.

In Step 1015, the data migration control part (a) 900 receives an instruction from the management server 160 to the effect that the information related to the migration-source host LU may be deleted, and executes the following processing. That is, the data migration control part (a) 900 releases all the pages allocated to the migration-source host LU, thereby making the respective pages free pages. Furthermore, in a case where an external page of the external capacity pool, the control authority for which is held by another virtual storage 110, is released at this time, the data migration control part (a) 900 identifies the external LU information 230 corresponding to this external capacity pool. The data migration control part (a) 900 sends this external page release request to the other virtual storage 110 identified from the control authority virtual storage 550 in this information 230. The data migration control part (a) 900 releases the external page in accordance with the request from the other virtual storage 110 corresponding to this release request. In addition, the data migration control part (a) 900 deletes the host LU information 260 corresponding to the migration-source host LU. Thereafter, the data migration control part (a) 900 notifies the management server 160 that this has been completed.

In Step 1016, the data migration control part (a) 900 identifies how many external pages allocated to the migration-source host LU exist in which external capacity pools.

In Step 1017, the data migration control part (a) 900 determines which virtual storage 110 has the control authority for each external capacity pool identified in Step 1016.

In Step 1018, the data migration control part (a) 900 determines whether or not there is an external capacity pool, for which the control authority is held by another virtual storage 110 other than the migration-source virtual storage 110 (own), as the external capacity pool comprising the external page allocated to the migration-source host LU. The control authority for the external capacity pool is the external page allocation/release authority.

In a case where the result of the determination of Step 1018 is negative (Step 1018: N), the processing jumps to Step 1020.

In a case where the result of the determination of Step 1018 is affirmative (Step 1018: Y), in Step 1019, the data migration control part (a) 900 sends information denoting the number of external pages identified in Step 1016 (the number of external pages allocated to the migration-source LU) with respect to this external capacity pool to the other virtual storage 110 that has the control authority for the external capacity pool. The data migration control part (a) 900 waits for a decision from the above-mentioned other virtual storage as to whether or not the control authority for the external capacity pool will be migrated.

In Step 1020, the data migration control part (a) 900 determines whether or not there is an external capacity pool, which comprises an external page allocated to the migration-source host LU, as the external capacity pool for which the control authority is held by the migration-source virtual storage 110 (own).

In a case where the result of the determination of Step 1020 is negative (Step 1020: N), the processing ends.

In a case where the result of the determination of Step 1020 is affirmative (Step 1020: Y, in Step 1021, the data migration control part (a) 900 determines whether or not the control authority of the external capacity pool is to be migrated.

In a case where the result of the determination of Step 1021 is negative (Step 1021: N), the processing ends.

In a case where the result of the determination of Step 1021 is affirmative (Step 1021: Y), in Step 1022, the data migration control part (a) 900 decides which virtual storage 110 to migrate the control authority of the external capacity pool to. For example, the LU migration-destination virtual storage is decided on here. In a case where the migration-destination virtual storage 110 of this control authority has been decided, the data migration control part (a) 900 sends the fact that this external capacity pool control authority is to be migrated, and all information denoted by the external capacity pool information 250 corresponding to this external capacity pool to the migration-destination virtual storage 110 of this control authority to the migration-destination virtual storage 110. Furthermore, after sending this information, the data migration control part (a) 900 resets the information in this external capacity pool information 250 to the prescribed values, and configures the identifier of the migration-destination virtual storage 110 as the control authority virtual storage 550 in the external LU information 240 corresponding to this external capacity pool.

In Step 1023, the data migration control part (a) 900 notifies all other virtual storages 110 (virtual storages other than the migration-source virtual storage and the control-authority migration-destination virtual storage) coupled to the external storage 130 comprising the external LU corresponding to this external capacity pool about the identifier of the control-authority migration-destination virtual storage 110. In addition, the data migration control part (a) 900 changes the value of the control authority information 540 in the external LU information 240 corresponding to this external LU to the value denoting OFF.

This completes the processing of the data migration control part (a) 900.

Figure 11:
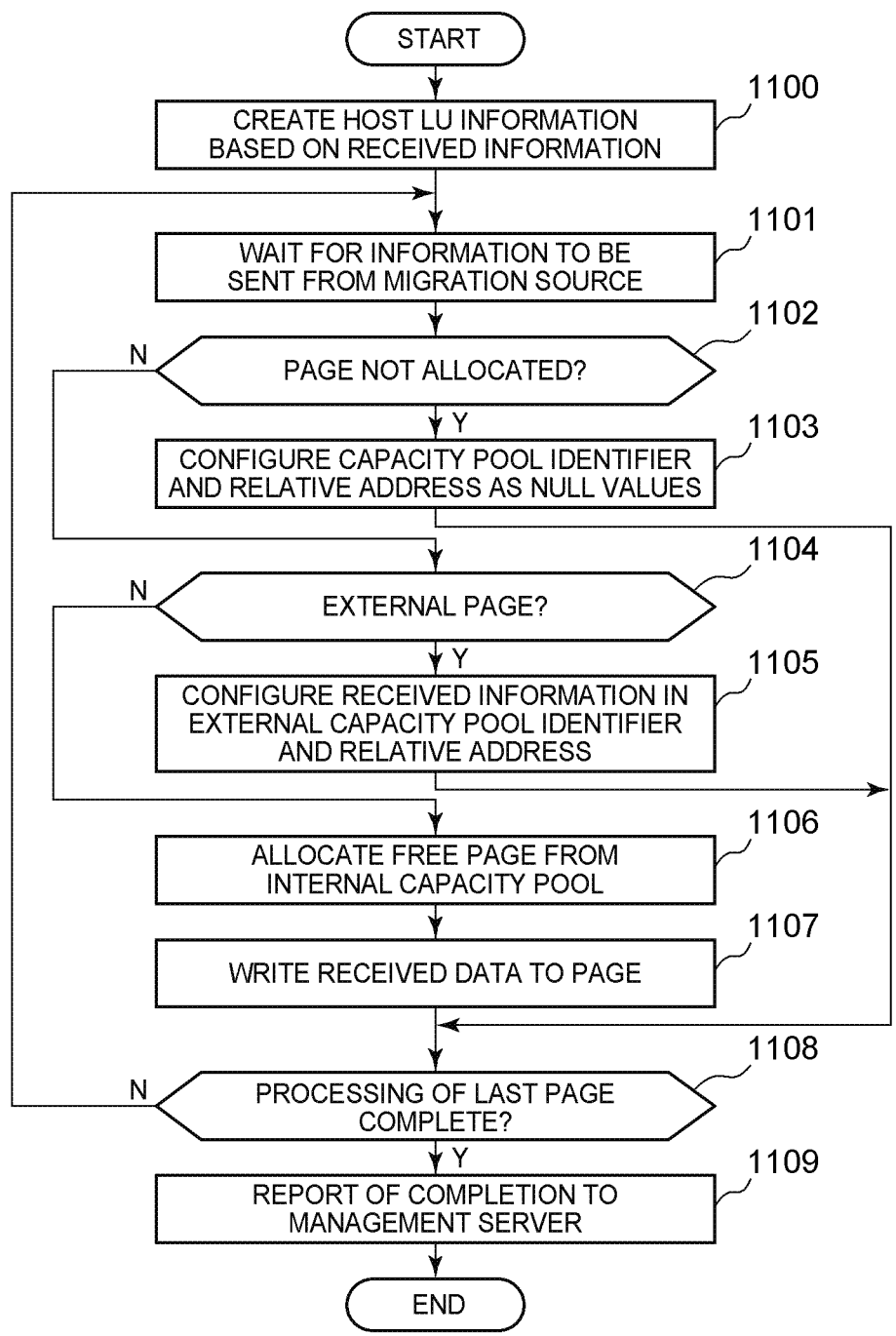
FIG. 11 shows an example of the flow of processing of a data migration execution part (a) in a migration-destination virtual storage related to Embodiment 1.

In Embodiment 1, the data migration execution part (a) 910 in the migration-destination virtual storage 110 receives from the management server 160 the identifier of the migration-source virtual storage 110, the identifier of the migration-source host LU, the identifier of the migration-destination host LU, and information denoting the virtual capacity of this host LU, and executes the flow of processing shown in FIG. 11.

FIG. 11 shows an example of the flow of processing of the data migration execution part (a) 910 of the migration-destination virtual storage 110.

In Step 1100, the data migration execution part (a) 910 creates host LU information 260 corresponding to the received host LU identifier. The received host LU identifier and a virtual capacity are configured in this information 260 as the host LU identifier 700 and the virtual capacity 710.

In Step 1101, the data migration execution part (a) 910 waits for information from the migration-source virtual storage 110.

In Step 1102, the data migration execution part (a) 910 determines whether information to the effect that a page has not been allocated to a LU area in the migration-destination host LU (the "target migration-destination area" in FIG. 11) corresponding to a LU area of the migration-source host LU (the target migration-source area) has been sent.

In a case where the result of the determination of Step 1102 is affirmative (Step 1102: Y), in Step 1103, the data migration execution part (a) 910 configures NULL values as the capacity pool identifier 770 and relative address 780 corresponding to the target migration-destination area. Thereafter, the processing jumps to Step 1108.

In Step 1104, the data migration execution part (a) 910 determines whether or not information to the effect that the target migration-destination area is allocated to an external page has been received.

In a case where the result of the determination of Step 1104 is affirmative (Step 1104: Y), in Step 1105, the data migration execution part (a) 910 configures the received external capacity pool identifier and relative address as the external capacity pool identifier 770 and the relative address 780 corresponding to the target migration-destination area. Thereafter, the processing jumps to Step 1108.

In a case where a request to secure a page has been received from the migration-source virtual storage 110, in Step 1106, the data migration execution part (a) 910 identifies a free internal page from the internal capacity pool in the migration-destination virtual storage 110 based on the internal capacity pool information 230 of the migration-destination virtual storage 110, and allocates the identified internal page to the target migration-destination area. Specifically, for example, the data migration execution part (a) 910 configures the identifier of the internal capacity pool comprising the allocated internal page as the capacity pool identifier 770 corresponding to the target migration-destination area, and configures the address of the internal page as the relative address 780 corresponding to the target migration-destination area.

In Step 1107, the data migration execution part (a) 910 writes data received from the migration-source virtual storage 110 to the internal page allocated in Step 1106.

In Step 1108, the data migration execution part (a) 910 determines whether or not the target migration-destination area is the last LU area in the migration-destination host LU (Step 1108).

In a case where the result of the determination of Step 1108 is negative (Step 1108: N), the data migration execution part (a) 910 jumps to Step 1101 and waits for the next request.

In a case where the result of the determination of Step 1108 is affirmative (Step 1108: Y), in Step 1109, the data migration execution part (a) 910 reports to the management server 160 that migration has been completed.

This ends the processing by the data migration execution part (a) 910.

In Embodiment 1, the management server 160, upon receiving information from the migration-source virtual storage 110 and the migration-destination virtual storage 110 that the host LU migration processing is complete, requests that the host 100 switch the destination of a read/write request specifying the LU identifier of the migration-source host LU to the migration-destination virtual storage 110. The LUN of the migration-source host LU and the LUN of the migration-destination host LU may be exchanged, or a World Wide Name maybe sent from the migration source to the migration destination, and the destination of a read/write request may be automatically switched to the migration-destination virtual storage 110 via the SAN (a) 120 or the like.

Thereafter, the management server 160 sends a request to the migration-source virtual storage 110 to delete the information of the migration-source host LU. In response to this request, the migration-source virtual storage 110 is able to reset the host LU information 260 corresponding to the migration-source host LU to a prescribed value.

Figure 12:
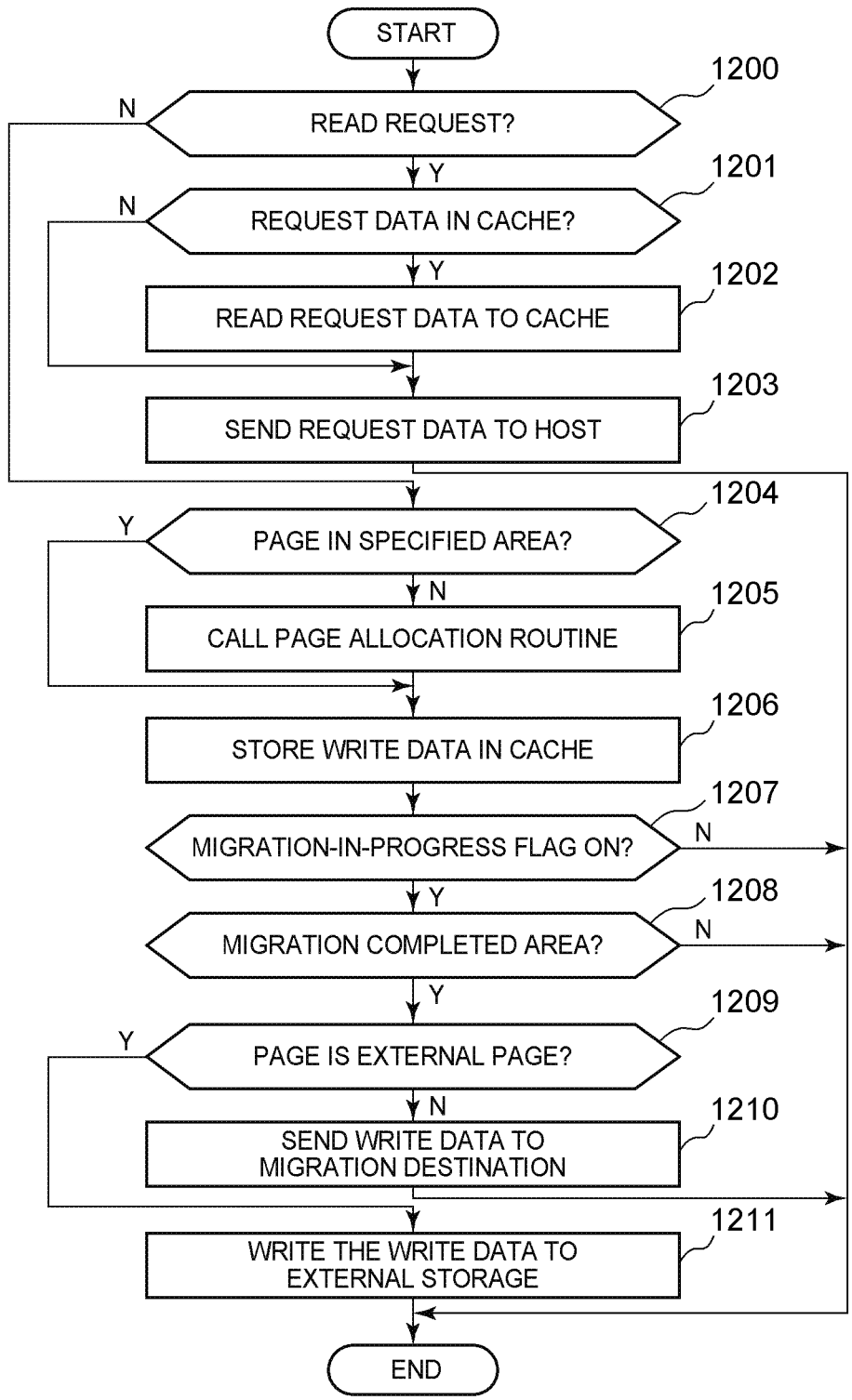
FIG. 12 shows an example of the flow of processing of a read/write execution part (a) in a migration-source virtual storage related to Embodiment 1.

FIG. 12 shows an example of the flow of processing of the read/write execution part (a) 920 in the migration-source virtual storage 110. This processing flow is executed when the migration-source virtual storage 110 receives from the host 100 a read/write request specifying a migration-source host LU while the migration-source host LU is in the process of being migrated.

In Step 1200, the read/write execution part (a) 920 checks whether the received request is a read request or a write request.

In a case where the request is a read request, the read/write execution part (a) 920 determines in Step 1201 whether or not the read-target data is in the cache memory 270.

In a case where the result of the determination of Step 1201 is affirmative (Step 1201: Y), the processing jumps to Step 1203.

In a case where the result of the determination of Step 1201 is negative (Step 1201: N), in Step 1202, the read/write execution part (a) 920 reads the read-target data from the page allocated to the LU area comprising the read source, and writes this read-target data to the cache memory 270.

In Step 1203, the read/write execution part (a) 920 reads the read-target data from the cache memory 270, and transfers this data to the host 100. This completes the processing.

In a case where the request is a write request, in Step 1204, the read/write execution part (a) 920 determines whether or not a page has been allocated to the LU area comprising the write destination specified in the write request.

In a case where the result of the determination of Step 1204 is negative (Step 1204: N), in Step 1205, the read/write execution part (a) 920 calls the page allocation processing part 930.

In Step 1206, the read/write execution part (a) 920 receives the write-target data from the host 100 and writes this data to the cache memory 270.

In Step 1207, the read/write execution part (a) 920 determines whether or not the migration-in-progress flag 730 in the host LU information 260 corresponding to the write-destination host LU is ON.

In a case where the result of the determination of Step 1207 is negative (Step 1207: N), the processing ends.

In a case where the result of the determination of Step 1207 is affirmative (Step 1207: Y), in Step 1208, the read/write execution part (a) 920 checks whether the migration process for the write-destination area has been completed based on the copy pointer 750. In a case where the relative address of the LU area denoted by the copy pointer 750 is an address subsequent to the relative address of the write-destination area, the migration process with respect to the write-destination area is complete.

In a case where the result of the determination of Step 1208 is negative (Step 1208: N), the processing ends.

In a case where the result of the determination of Step 1208 is affirmative (Step 1208: Y), in Step 1209, the read/write execution part (a) 920 determines whether or not the page allocated to the write-destination area is an external page.

In a case where the result of the determination of Step 1209 is negative (Step 1209: N), in Step 1210, the read/write execution part (a) 920 sends the write-target data stored in the cache memory 270 and the write request thereof (the request comprising the LU identifier of the write-destination LU and the relative address of the write-destination LU area) to the migration-destination virtual storage 110. Thereafter, the processing ends. Furthermore, the migration-destination virtual storage 110, upon receiving this write request, identifies the host LU corresponding to the write-destination LU specified in this write request and the LU area corresponding to the write-destination LU area specified in this write request, and writes the write-target data from the migration-source virtual storage to the internal page allocated to the identified LU area inside the identified host LU.

In a case where the result of the determination of Step 1209 is affirmative (Step 1209: Y), in Step 1211, the read/write execution part (a) 920 sends the write-target data stored in the cache memory 270 and the write request thereof (the request comprising the LUN of the external LU corresponding to the external capacity pool comprising the external page allocated to the write-destination LU area and the relative address corresponding to this external page) to the external storage 130 comprising this external LU. This completes the processing. Furthermore, the external storage 130, upon receiving this write request, identifies the external LU specified in this write request and the external LU area corresponding to the relative address specified in this write request, and writes the write-target data from the migration-source virtual storage to the identified external LU area inside the identified external LU.

Figure 13:
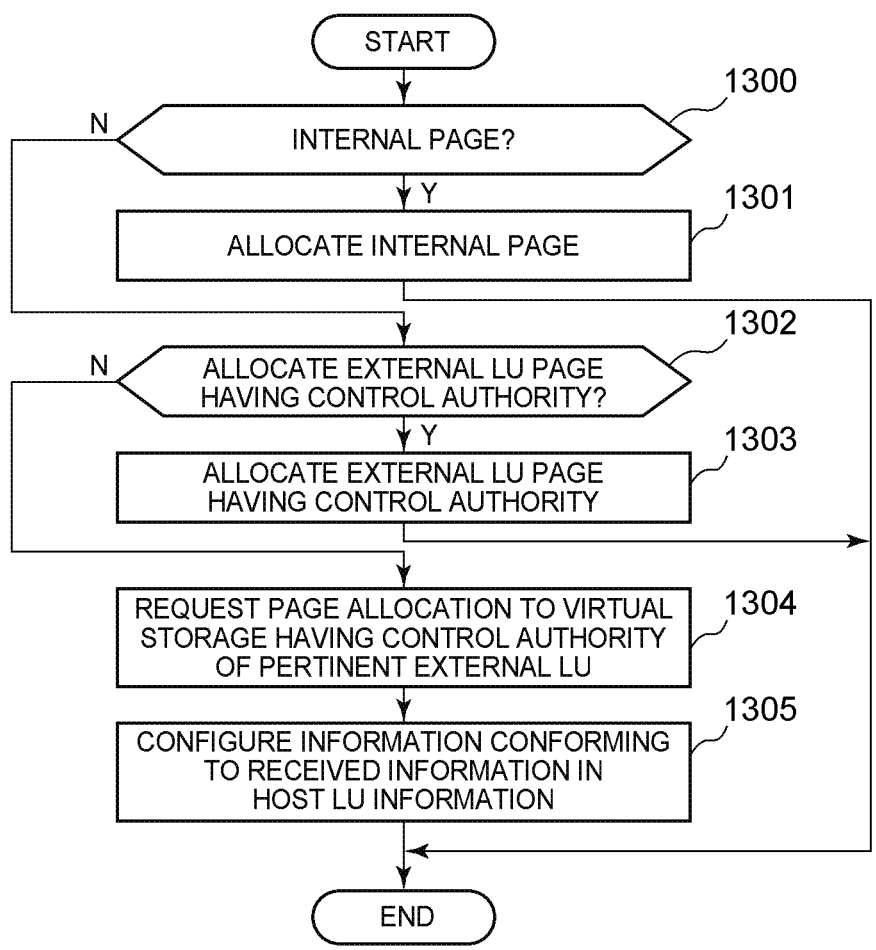
FIG. 13 shows an example of the flow of processing of a page allocation processor related to Embodiment 1.

FIG. 13 shows an example of the flow of processing of the page allocation processing part 930. The page allocation processing part 930, in a case where the virtual storage 110 receives a write request specifying a LU area to which a page has not been allocated, executes a process for allocating a page to this LU area.

In Step 1300, the page allocation processing part 930 determines whether or not to allocate an internal page. Whether or not an internal page should be allocated may be decided in accordance with a prescribed rule. As the rule, for example, at least one of the following is conceivable.

- An internal page and an external page are alternately allocated to the host LU.
- An internal page is preferentially allocated to the host LU, and in a case where the percentage of allocated internal pages of the internal capacity pool associated with the host LU is equal to or less than a prescribed percentage, an external page is allocated from the external capacity pool associated with the host LU.

In a case where the result of the determination of Step 1300 is affirmative (Step 1300: Y), in Step 1301, the page allocation processing part 930 decides on the page to be allocated based on the internal capacity pool information 230 corresponding to the internal capacity pool associated with the write-destination LU, and updates information that should be updated using the information in this internal capacity pool information 230. In addition, the page allocation processing part 930 configures the identifier of the internal capacity pool comprising the decided internal page and the address of the decided internal pool as the capacity pool identifier 770 and the relative address 780 in the host LU information 260 corresponding to the write-destination LU. Thereafter, the processing ends.

In a case where the result of the determination of Step 1300 is negative (Step 1300: N), in Step 1302, the page allocation processing part 930 decides on the allocation-source external capacity pool. Furthermore, the page allocation processing part 930, based on the control authority information 540 in the external LU information 240 corresponding to this external LU, determines whether or not the virtual storage comprising this processing part 930 is the control authority for the external LU corresponding to this external capacity pool.

In a case where the result of the determination of Step 1302 is affirmative (Step 1302: Y), in Step 1303, the page allocation processing part 930 decides on the external page to be allocated based on the external capacity pool information 250 corresponding to this external LU, and updates the information that should be updated using the information in the external capacity pool information 250. In addition, the page allocation processing part 930 configures the identifier of the external capacity pool decided in Step 1302 and the address of the external page decided in Step 1303 as the capacity pool identifier 770 and the relative address in the host LU information 260 corresponding to the write-destination LU. Thereafter, processing ends.

In a case where the result of the determination of Step 1302 is negative (Step 1302: N), in Step 1304, the page allocation processing part 930 requests a page allocation from the virtual storage 110 comprising the control authority of the external capacity pool decided in Step 1302, and waits for a response.

In Step 1305, the page allocation processing part 930 receives a page address from the request-destination virtual storage in Step 1304, and configures the identifier of the external capacity pool decided in Step 1302 and the received address as the capacity pool identifier 770 and the relative address 780 in the host LU information 260 corresponding to the write-destination LU. Thereafter, processing ends.

Figure 14:
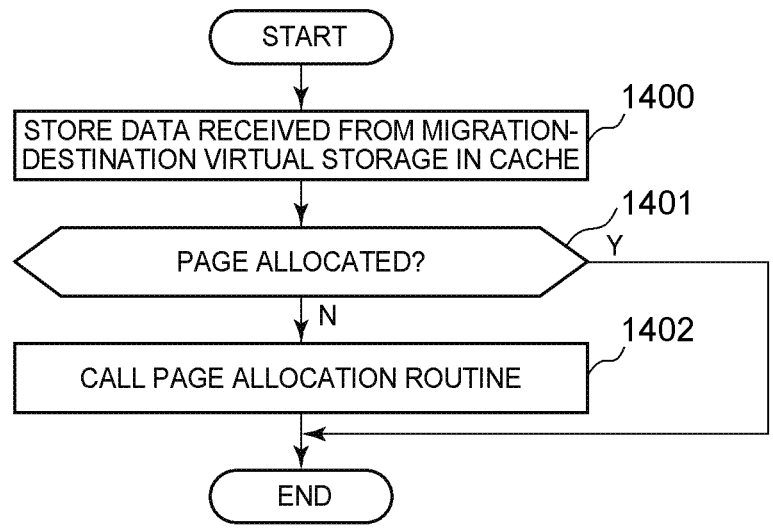
FIG. 14 shows an example of the flow of processing of a write data receiving part in a migration-destination virtual storage related to Embodiment 1.

FIG. 14 shows an example of the flow of processing of the write data receiving part 940 in the migration-destination virtual storage. The write data receiving part 940 receives write-target data from the migration-source virtual storage 110.

In Step 1400, the write data receiving part 940 receives the write-target data from the migration-source virtual storage 110, and stores this data in the cache memory 270.

In Step 1401, the write data receiving part 940 determines whether or not a page has been allocated to the write-destination LU area with respect to this data.

In a case where the result of the determination of Step 1401 is affirmative (Step 1401: Y), the processing ends.

In a case where the result of the determination of Step 1401 is negative (Step 1401: N), in Step 1402, the write data receiving part 940 calls the page allocation part 930, and allocates a page to the write-destination LU area. Thereafter, the processing ends.

Figure 15:
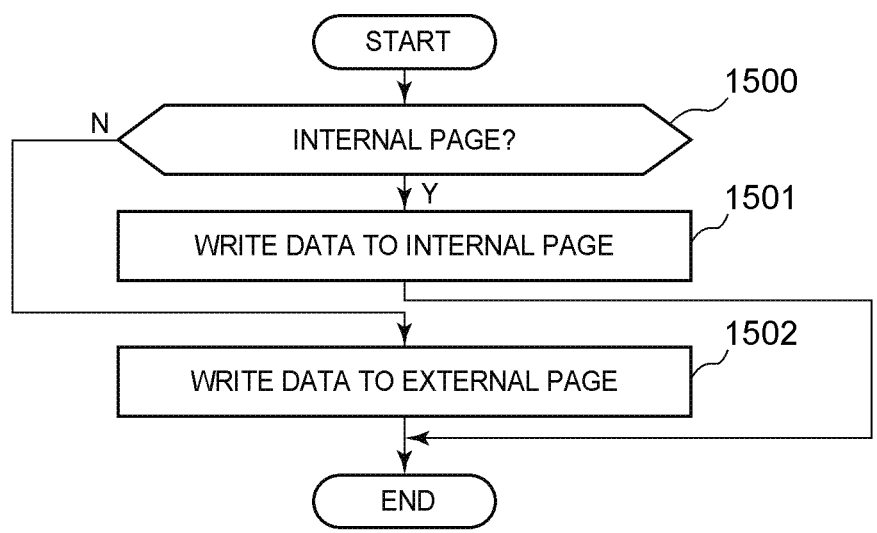
FIG. 15 shows an example of the flow of processing of a write-after processing part related to Embodiment 1.

FIG. 15 shows an example of the flow of processing of the write-after processing part 950. The write-after processing part 950 writes the write-target data inside the cache memory 270 (the data that has not been written to the page that was allocated to the write-destination LU area) to the page.

In Step 1500, the write-after processing part 950 determines whether the page allocated to the write-destination LU area of the write-target data is an internal page or an external page.

In a case where the page is an internal page, in Step 1501, the write-after processing part 950 writes the data from the cache memory 270 to the internal page. Thereafter, the processing ends.

In a case where the page is an external page, in Step 1502, the write-after processing part 950 sends the data inside the cache memory 270 and the write request therefor (the request that specifies the identifier of the external LU comprising this external page and the relative address of this external page) to the external storage 130. Thereafter, the processing ends.

Figure 16:
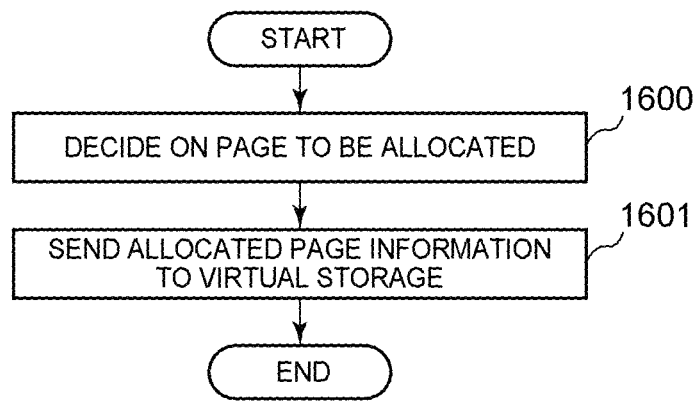
FIG. 16 shows an example of the flow of processing of an external page allocation processing part related to Embodiment 1.

FIG. 16 shows an example of the flow of processing of the external page allocation processing part 960. The external page allocation processing part 960 executes the following process when the virtual storage 110 having the control authority for the external capacity pool receives a page allocation request from another virtual storage 110.

In Step 1600, the external page allocation processing part 960 decides on the external page to be allocated based on the external capacity pool information 250 corresponding to the decided external capacity pool, and updates the information that should be updated using the information in the external capacity pool information 250 (allocates an external page to the LU area).

In Step 1601, the external page allocation processing part 960 sends the address of the allocated external page to the virtual storage 110 that requested the allocation. Thereafter, the processing ends.

Figure 17:
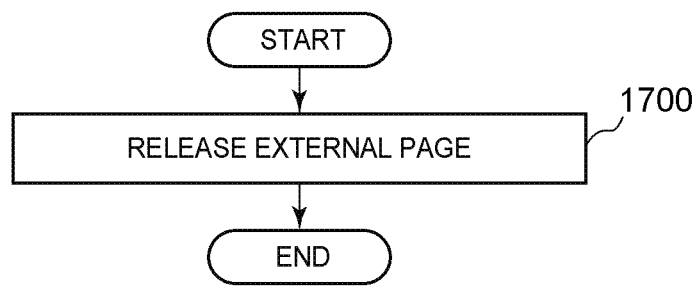
FIG. 17 shows an example of the flow of processing of an external page release processing part related to Embodiment 1.

FIG. 17 shows an example of the flow of processing of the external page release processing part 970. The external page release processing part 970 executes the following process when the virtual storage 110 having the control authority for the external capacity pool receives a page release request from the other virtual storage 110.

In Step 1700, the external page release processing part 970, based on the received information, identifies the external page to be released from the external capacity pool information 250, and updates the information that should be updated using the information in the external capacity pool information 250 (releases the identified external page).

Figure 18:
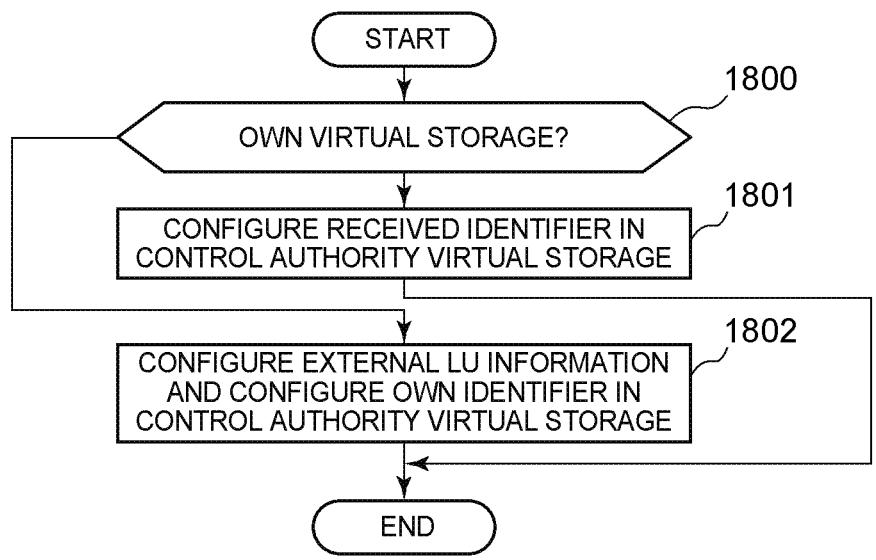
FIG. 18 shows an example of the flow of processing of a control authority migration part related to Embodiment 1.

FIG. 18 shows an example of the flow of processing of the control authority migration part 980. The control authority migration part 980 executes the following process upon receiving the migration of an external LU (external capacity pool) control authority from another virtual storage 110.

In Step 1800, the control authority migration part 980 determines whether or not the control authority migration destination is the virtual storage 110 comprising this control authority migration part 980 (its own virtual storage).

In a case where the result of the determination of Step 1800 is negative (Step 1800: N), in Step 1801, the control authority migration part 980 configures the identifier of the other virtual storage 110 as the control authority virtual storage 550 corresponding to the external LU (external capacity pool) specified in the received information. Thereafter, the processing ends.

In a case where the result of the determination of Step 1800 is affirmative (Step 1800: Y), in Step 1802, the control authority migration part 980, based on the received information, configures the value of the control authority information 540 corresponding to this external LU (external capacity pool) to ON, and configures the identifier of its own virtual storage 110 as the control authority virtual storage 550. In addition, the control authority migration part 980 creates and registers information related to the external capacity pool that conforms to the received information as the external capacity pool information 250.

Figure 24:
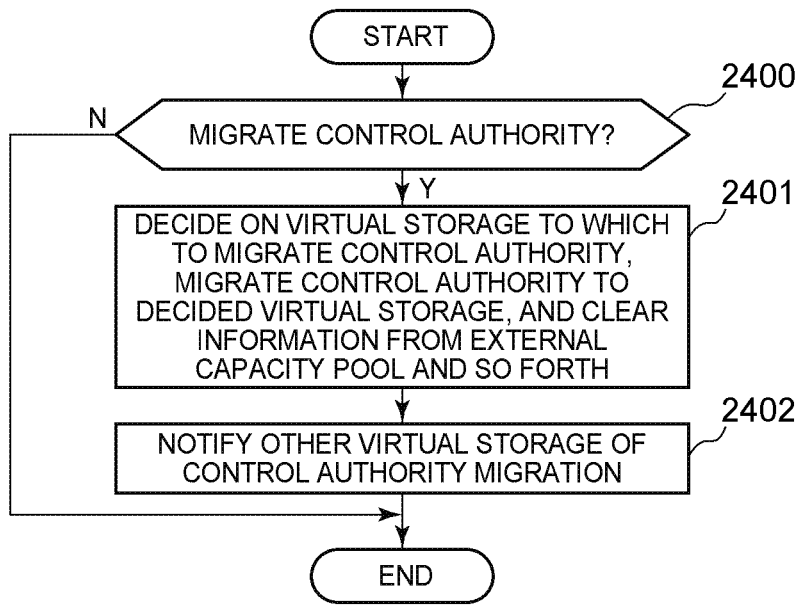
FIG. 24 shows an example of the flow of processing of a control authority migration decision part related to Embodiment 1.

FIG. 24 shows an example of the flow of processing of the control authority migration decision part 990. The control authority migration decision part 990 executes the following process upon receiving a request to make a determination as to whether or not to migrate the control authority to the other storage apparatus 110 in accordance with the migration of the host LU executed by the other virtual storage 110.

In Step 2400, the control authority migration decision part 990 decides, based on the received information, whether or not to migrate the control authority (the allocation/release authority) of the external LU (external capacity pool). In most cases, it is decided that the control authority will not be migrated from the migration-source virtual storage, but, for example, in a case where the load on the migration-source virtual storage is higher than a prescribed load, it is decided that the control authority will be migrated from the migration-source virtual storage.

In a case where the result of the determination of Step 2400 is negative (Step 2400: N), the processing ends.

In Step 2401, the control authority migration decision part 990 decides on the virtual storage 110 to which the authority is to be migrated. The control authority migration decision part 990 migrates the control authority to the control authority migration-destination virtual storage 110, and sends all the information of the corresponding external capacity pool information 250 to the virtual storage 110. Furthermore, subsequent to sending this information, the control authority migration decision part 990 resets the information of the corresponding external capacity pool information 250, and configures the identifier of the migration-destination virtual storage 110 as the control authority virtual storage 550. In addition, the control authority migration decision part 990 configures the value of the control authority information 540 in the external LU information 240 corresponding to this external LU to OFF.

In Step 2402, the control authority migration decision part 990 notifies the other virtual storage 110 coupled to the external storage 130 comprising this external LU of the identifier of the control authority migration-destination virtual storage 110. This completes the processing.

Embodiment 2

Embodiment 2 will be explained hereinbelow. In so doing, the points of difference with Embodiment 1 will mainly be explained, and explanations of the points shared in common with Embodiment 1 will either be omitted or simplified.

Figure 19:
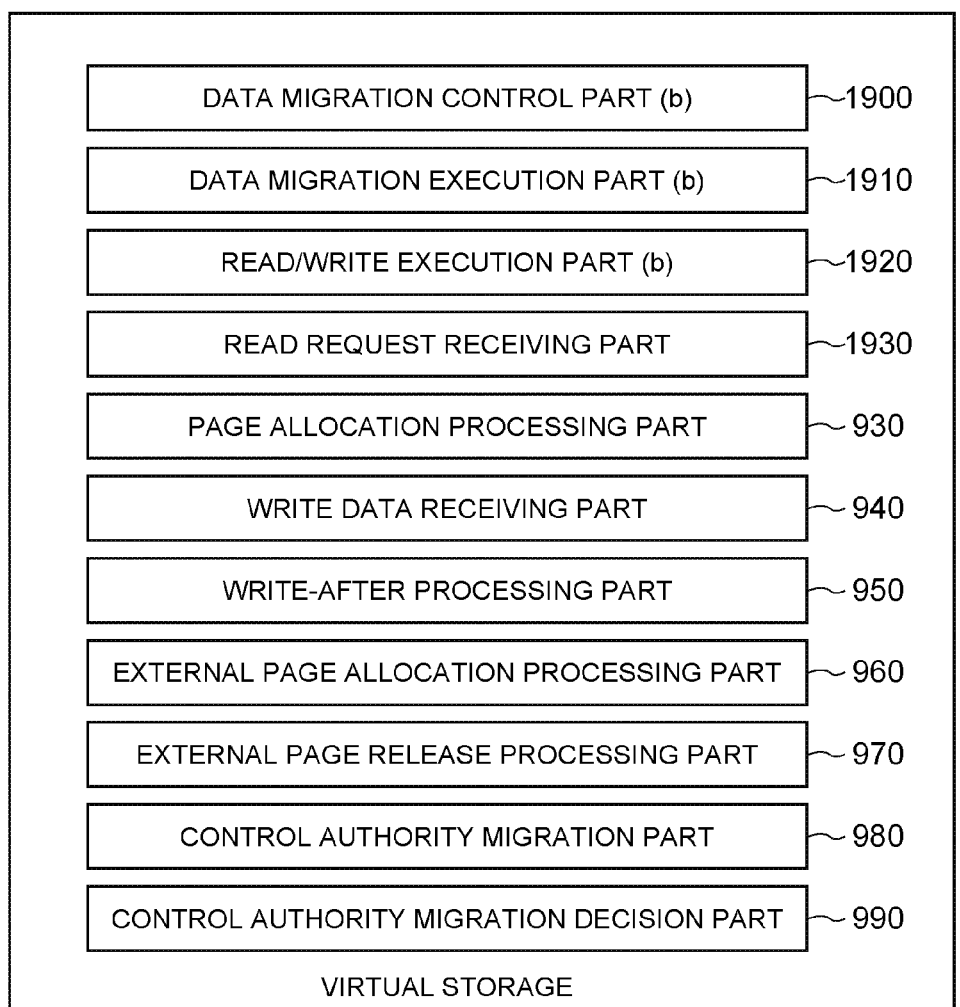
FIG. 19 shows an example of multiple functions realized by a virtual storage 110 related to Embodiment 2.

FIG. 19 shows an example of multiple functions realized by a virtual storage 110 related to Embodiment 2.

In Embodiment 2, as the multiple functions, there are a data migration control part (b) 1900, a data migration execution part (b) 1910, a read/write execution part (b) 1920, a read request receiving part 1930, a page allocation processing part 930, a write data receiving part 940, a write-after processing part 950, an external page allocation processing part 960, an external page release processing part 970, a control authority migration part 980, and a control authority migration decision part 990.

Of these, the page allocation processing part 930, the page allocation processing part 930, the write data receiving part 940, the write-after processing part 950, the external page allocation processing part 960, the external page release processing part 970, the control authority migration part 980, and the control authority migration decision part 990 are shared in common with Embodiment 1, and as such, explanations will be omitted.

In Embodiment 2, the migration-destination virtual storage 110 executes the control over the migration process when a host LU is migrated from the migration-source virtual storage 110 to the migration-destination virtual storage 110. Furthermore, during the migration process, the host 100 will issue a read/write request to the migration-destination virtual storage.

In Embodiment 2, too, the management server 160 checks the load of each virtual storage 110 and decides on the migration-source host LU and the migration-destination virtual storage 110. The management server 160 sends the identifier of the migration-source host LU, the identifier of the migration-destination virtual storage 110, and the identifier of the migration-destination host LU to the migration-source virtual storage 110. Furthermore, the management server 160 sends the identifier of the migration-destination virtual storage 110, the identifier of the migration-source virtual storage 110, the identifier of the migration-source LU, the identifier of the migration-destination host LU, and the virtual capacity of the migration-source host LU to the migration-destination virtual storage 110. When reports of receipt are returned from both the migration-source virtual storage 110 and the migration-destination virtual storage 110, the management server 160 requests that the host 100 switch the address of the migration-destination host LU read-write request to the migration-destination virtual storage 110. A World Wide Name may be inherited, and the address of the read-write request may be switched automatically to the migration-destination virtual storage via the SAN 120 or the like.

Figure 20:
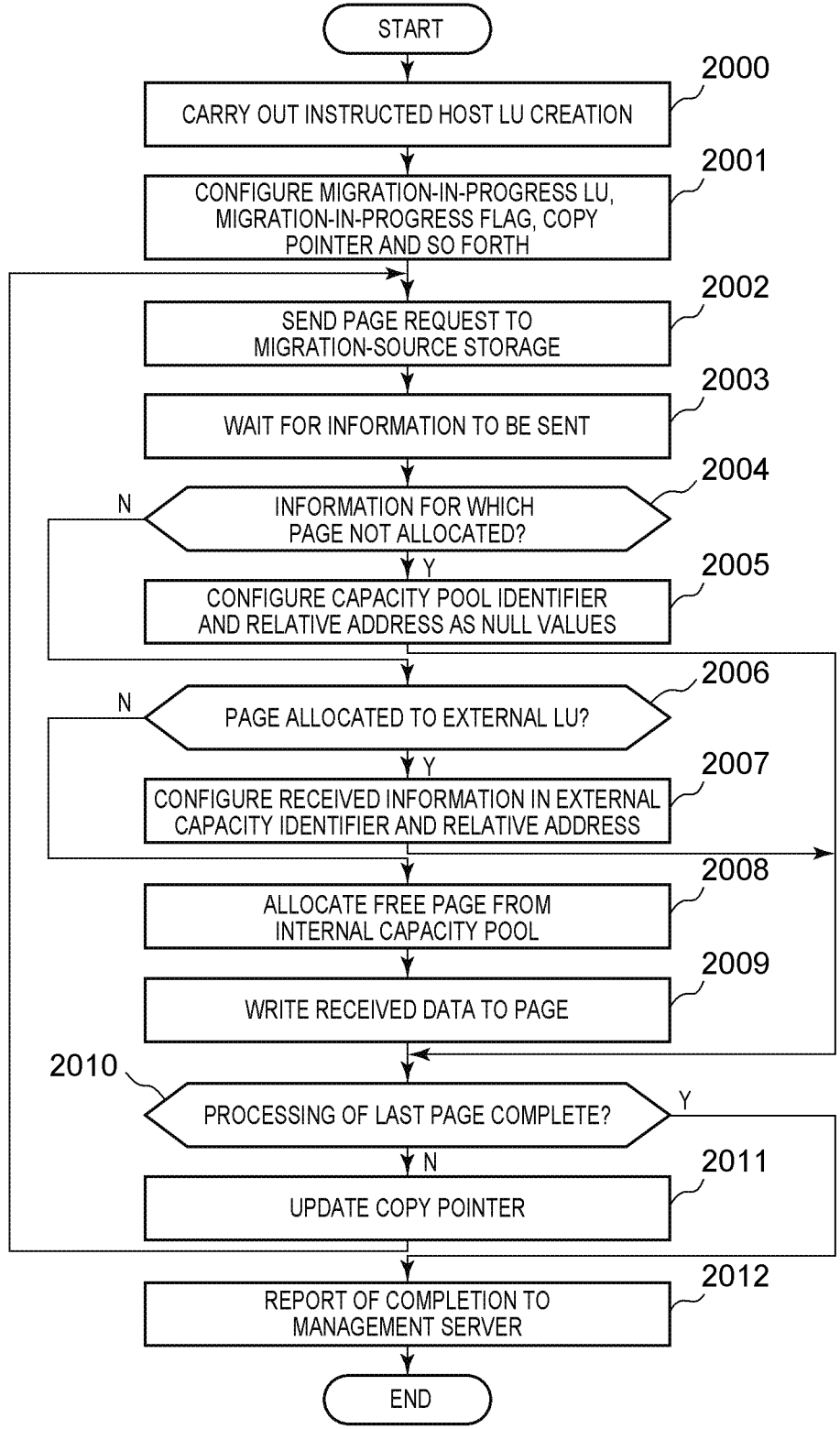
FIG. 20 shows an example of the flow of processing of a data migration control part (b) in a migration-destination virtual storage related to Embodiment 2.

In Embodiment 2, the data migration control part (b) 1900 in the migration-destination virtual storage 110 receives information comprising the identifier of the migration-source virtual storage 110, the identifier of the migration-source host LU, the identifier of the migration-destination host LU, and the virtual capacity of the migration-source host LU from the management server 160, and after responding to the management server 160 that this information has been received, executes the following flow of processing shown in FIG. 20.

FIG. 20 shows an example of the flow of processing of the data migration control part (b) 1900 in the migration-destination virtual storage 110.

In Step 2000, the data migration control part (b) 1900 creates host LU information corresponding to the migration-destination host LU (the identifier of the received host LU). The data migration control part (b) 1900 configures the identifier and the virtual capacity of the migration-destination host LU as the host LU identifier 700 and the virtual capacity 710.

In Step 2001, the data migration control part (b) 1900 configures the migration-in-progress flag 730 corresponding to the migration-destination host LU to ON. In addition, the data migration control part (b) 1900 configures the identifier of the migration-destination virtual storage 110 and the identifier of the migration-destination LU received from the management server 160 as the migration-in-progress virtual storage identifier 740 and the migration-in-progress host LU identifier 750 corresponding to the migration-destination host LU. In addition, the data migration control part (b) 1900 configures the copy pointer 760 in the initial LU area.

In Step 2002, the data migration control part (b) 1900 requests a processing request for the LU area (hereinafter, the "target migration-destination area" in the explanation of FIG. 20) denoted by the copy pointer 760 from the migration-source virtual storage 110.

In Step 2003, the data migration control part (b) 1900 waits for information to be sent from the virtual storage 110 that will become the migration destination.

Steps 2004 through 2009 are the same as Steps 1102 through 1107 of FIG. 11, and as such, explanations will be omitted.

In Step 2010, the data migration control part (b) 1900 determines whether or not the target migration-destination area is the last LU area in the migration-destination host LU.

In a case where the result of the determination of Step 2010 is negative (Step 2010: N), in Step 2011, the data migration control part (b) 1900 configures information denoting the next LU area as the copy pointer 760 in the host LU information 260 corresponding to the migration-destination host LU, and jumps to Step 2002.

In a case where the result of the determination of Step 2010 is affirmative (Step 2010: Y), Step 2012 and subsequent steps are carried out. However, Steps 2012 through 2014 are the same as Steps 1109 through 1111 of FIG. 11, and as such explanations will be omitted.

Figure 21:
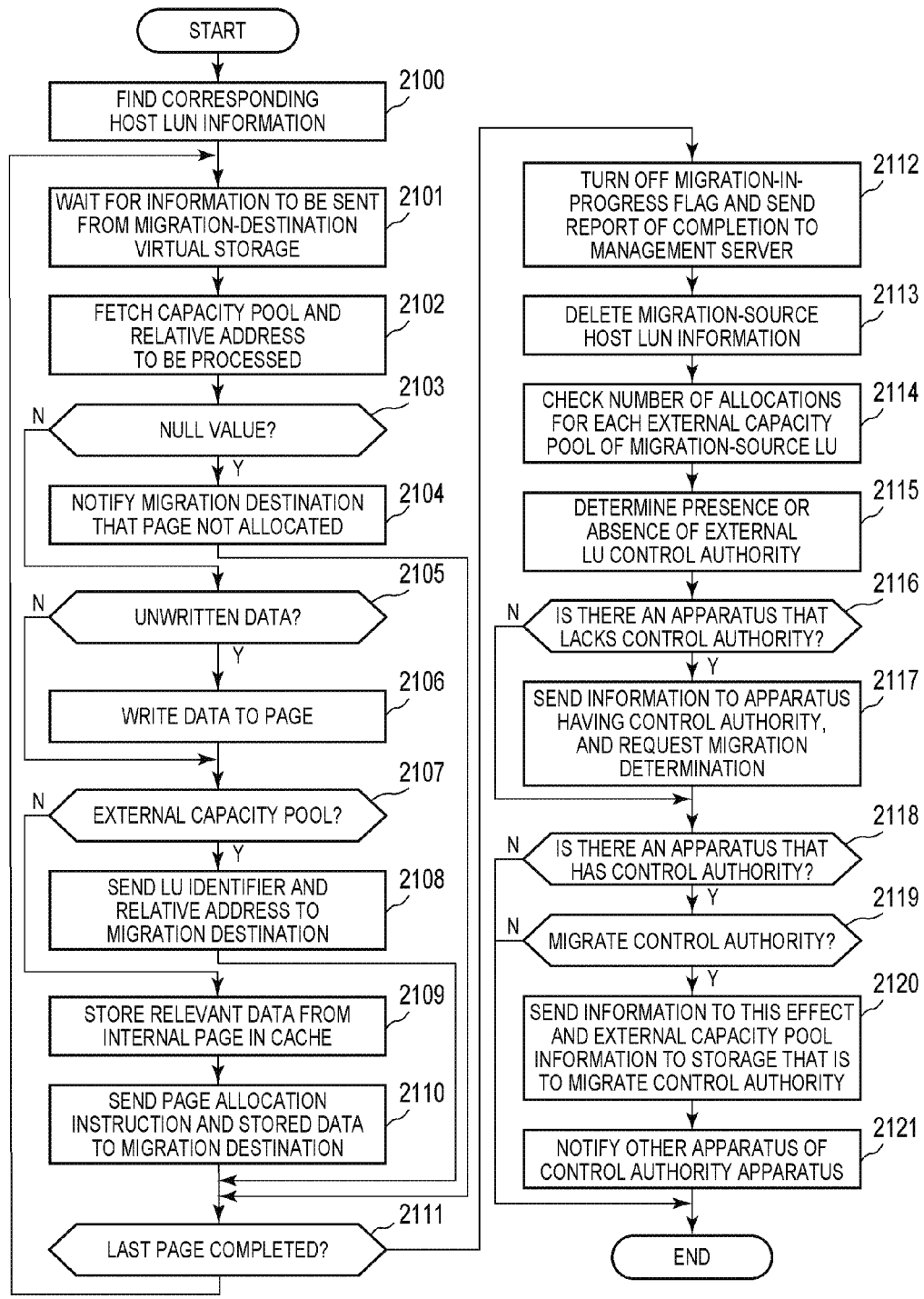
FIG. 21 shows an example of the flow of processing of a data migration execution part (b) in a migration-source virtual storage related to Embodiment 2.

In Embodiment 2, the data migration execution part (b) 1910 of the migration-source virtual storage 110 receives information comprising the identifier of the migration-destination virtual storage 110, the identifier of the migration-destination host LU, and the identifier of the migration-source LU from the management server 160, and after responding to the management server 160 that this information has been received, receives a request and executes the flow of processing shown in FIG. 21.

FIG. 21 shows an example of the flow of processing of the data migration execution part (b) 1910 of the migration-source virtual storage 110.

In Step 2100, the data migration execution part (b) 1910 finds the host LU information corresponding to the identifier of the migration-source host LU.

In Step 2101, the data migration execution part (b) 1910 waits for a processing request to be sent from the migration-destination virtual storage 110.

When the processing request from the migration-destination virtual storage 110 arrives, Step 2102 and subsequent steps are executed with respect to the migration-source LU area (the "target migration-source area" in FIG. 21) corresponding to the target migration-destination area conforming to this request. However, since Steps 2102 through 2110 are the same as Steps 1002 through 1010 of FIG. 10, explanations will be omitted.

In Step 2111, the data migration execution part (b) 1910 determines whether or not the target migration-source area is the last LU area in the migration-source host LU.

In a case where the result of the determination of Step 2111 is negative (Step 2111: N), the data migration execution part (b) 1910 jumps to Step 2101, and waits for the next processing request to be sent from the migration-destination virtual storage 110.

In a case where the result of the determination of Step 2111 is affirmative (Step 2111: Y), in Step 2112, the data migration execution part (b) 1910 reports the fact that the migration process has been completed to the management server 160. Thereafter, the processing ends.

Steps 2113 through 2121 are the same as Steps 1015 through 1023 of FIG. 10. For this reason, explanations will be omitted. In Embodiment 2, when the management server 160 receives information that the host LU migration process is complete from the migration-source virtual storage 110 and the migration-destination virtual storage 110, the management server 160 issues an instruction to the migration-source virtual storage 110 to delete the information of the migration-source host LU.

Figure 22:
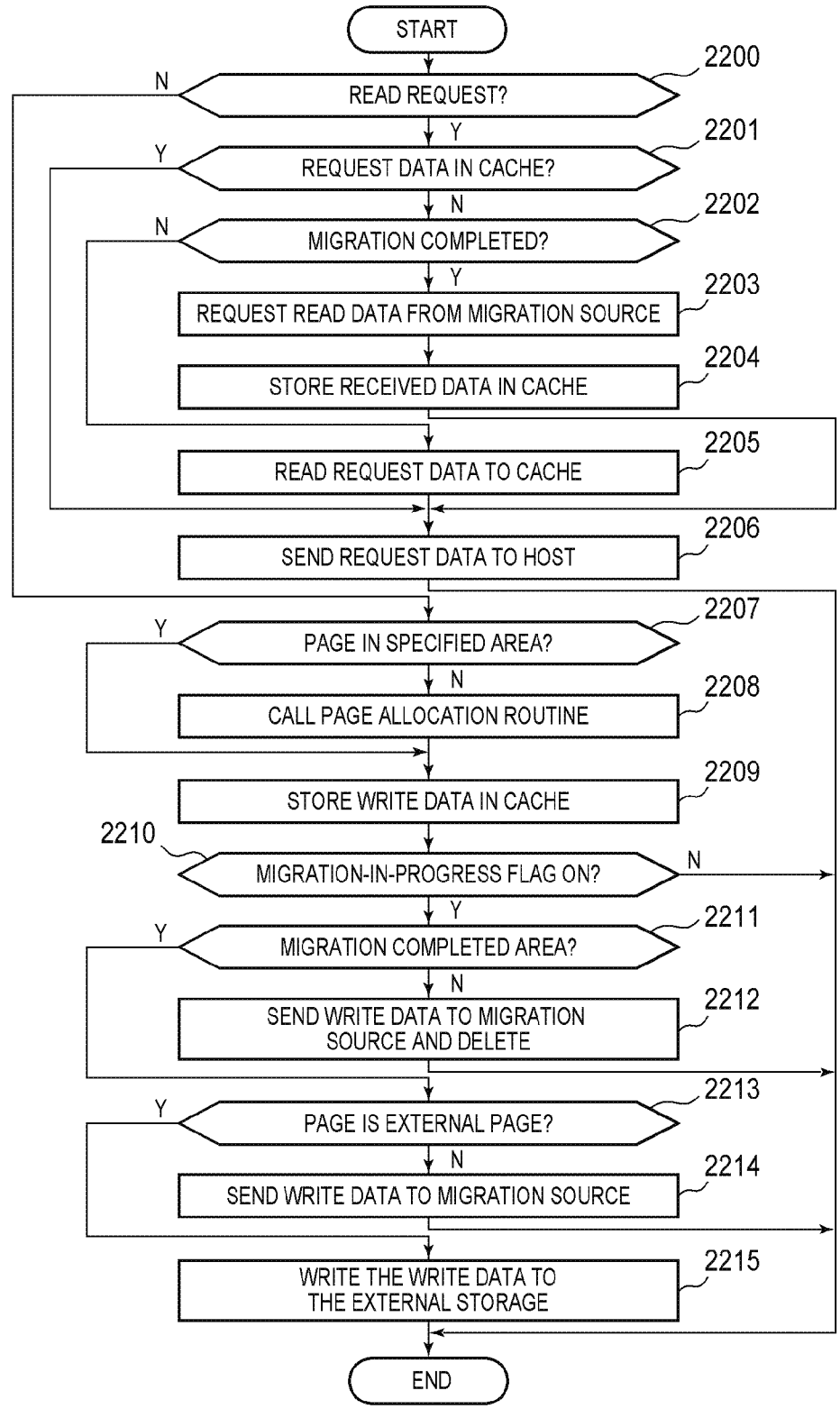
FIG. 22 shows an example of the flow of processing of a read/write execution part (b) in a migration-destination virtual storage related to Embodiment 2.

FIG. 22 shows an example of the flow of processing of the read/write execution part (b) 1920 in the migration-destination virtual storage 110. This processing is executed in a case where, while a host LU is in the process of being migrated, the migration-destination virtual storage 110 receives from the host 100 a read/write request that specifies the migration-in-progress host LU.

In Step 2200, the read/write execution part (b) 1920 determines whether the received request is a read request or a write request.

In a case where the request is a read request, in Step 2201, the read/write execution part (b) 1920 determines whether or not the read-target data exists in the cache memory 270. In a case where the result of this determination is affirmative (Step 2210: Y), the processing jumps to Step 2206, and in a case where the result of this determination is negative (Step 2210: N), Step 2202 is carried out.

In Step 2202, the read/write execution part (b) 1920 determines whether or not the migration-in-progress flag 730 corresponding to the read-source host LU is ON, and whether or not the migration with respect to the read-source LU area has been completed. In a case where the address denoted by the copy pointer 760 corresponding to the read-source host LU is an address subsequent to the address of the read-source LU area, the migration of the read-source LU area is complete.

In a case where the result of the determination of Step 2202 is negative (Step 2202: N, the processing jumps to Step 2205.

In a case where the result of the determination of Step 2202 is affirmative (Step 2202: Y), in a case where it is not, in Step 2203, the read/write execution part (b) 1920 requests that the migration-source virtual storage 110 send the data in the LU area corresponding to the read-source LU area (the LU area inside the migration-destination host LU), and waits for this data to be sent. In Step 2204, the read/write execution part (b) 1920 writes the sent data to the cache memory 270.

Steps 2205 and 2206 are the same as the Steps 1202 and 1203 of FIG. 12, and as such, explanations will be omitted.

In the case of a write request, the processing of Step 2207 and subsequent steps is executed. However, the processing of Steps 2207 through 2211 is the same as that of Steps 1204 through 1208 of FIG. 12, and as such explanations will be omitted.

In Step 2211 of FIG. 22, in a case where it has been determined based on the copy pointer 760 that the migration process with respect to the write-destination LU area is not complete (Step 2211: N), in Step 2212, the read/write execution part (b) 1920 sends the write-target data inside the cache memory and the write request therefor (the request comprising the identifier of the write-destination LU and the address of the write-destination LU area) to the migration-source virtual storage 110. In accordance with this, the write-target data is written to the page that is allocated to the LU area corresponding to the write-destination LU area (the LU area of the migration-source host LU) in the migration-source virtual storage. The read/write execution part (b) 1920, upon receiving a report of completion from the migration-source virtual storage 110 deletes this write-target data from the cache memory 270. Thereafter, the processing ends.

In a case where the write-destination LU area is an area for which the migration processing has been completed, Steps 2213 through 2215 are carried out. However, Steps 2213 through 2215 are the same as Steps 1209 through 1211 (exclusive of Step 2214) of Step 12. The processing of Step 2214 corresponds to Step 1210 of FIG. 12. In Step 2214, the write-target data inside the cache memory 270 of the migration-destination virtual storage 110 is sent to the migration-source virtual storage 110 (In Step 1210 of FIG. 12, by contrast, the write-target data inside the cache memory 270 of the migration-source virtual storage 110 is sent to the migration-destination virtual storage.).

Figure 23:
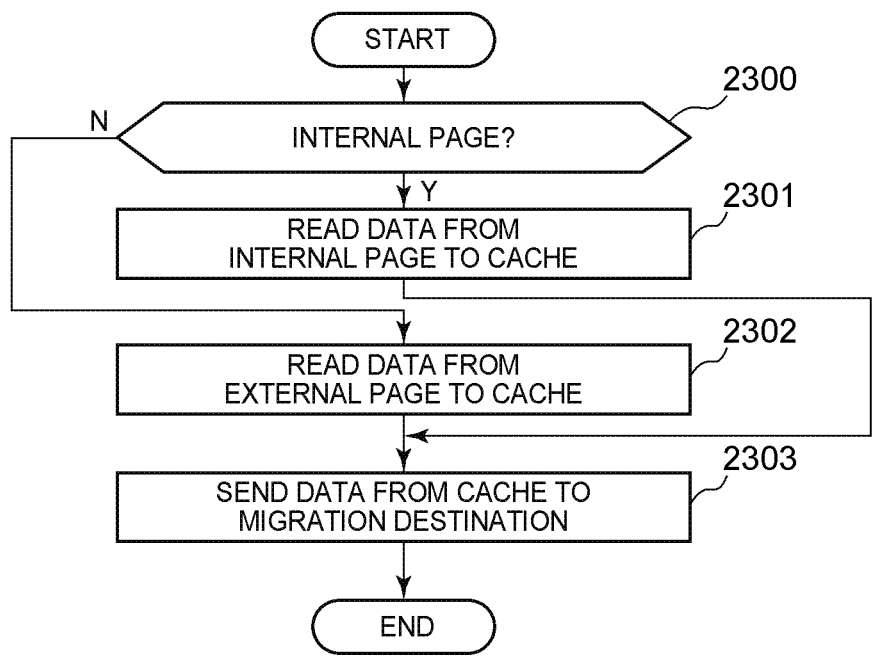
FIG. 23 shows an example of the flow of processing of a read request receiving part in a migration-source virtual storage related to Embodiment 2.

FIG. 23 shows an example of the flow of processing of the read request receiving part 1930 of the migration-source virtual storage 110. The read request receiving part 1930 executes the following processing when the migration-source virtual storage 110 receives a request from the migration-destination virtual storage 110 to send data.

In Step 2300, the read request receiving part 1930 determines whether the data read source is an internal page or an external page.

In a case where the page is an internal page, in Step 2301, the read request receiving part 1930 reads data from the internal page and stores this data in the cache memory 270. Thereafter, the processing jumps to Step 2303.

In a case where the page is an external page, in Step 2302, the read request receiving part 1930 sends a read request comprising external access destination information corresponding to this external page (information comprising the identifier of the external LU and the relative address of the external LU area) to the external storage 130. The read request receiving part 1930 stores the data received from the external storage 130 in response to this read request in the cache memory 270.

In Step 2303, the read request receiving part 1930 sends the data read from the cache memory 270 to the migration-destination virtual storage 110. Thereafter, the processing ends.

Embodiment 3

Embodiment 3 will be explained below.

In Embodiment 3 and Embodiment 4 to be explained below, an existing virtual storage 110 is replaced by a newly provided virtual storage 110. First of all, items shared in common in Embodiments 3 and 4 will be explained. In so doing, the existing (replaced) virtual storage 110 will be called the "old virtual storage 110", and the newly provided virtual storage 110 will be called the "new virtual storage 110.

First of all, the following procedures are executed in preparation for migrating the host LU.

(1) The new virtual storage 110 is coupled to the host 100 by way of the SAN (a) 120, and the host 100 recognizes the new virtual storage 110. However, the new virtual storage 110 may be directly coupled to the host 100.

(2) The new virtual storage 110 is coupled to the management server 160, and the management server 160 recognizes the new virtual storage 110.

(3) The new virtual storage 110 is coupled via the SAN (b) 150 to all external storages 130 that are coupled to the old virtual storage 110. The new virtual storage 110 recognizes the external LU in the external storage 130, and stores the external LU information 240 corresponding to this external LU. However, the new virtual storage 110 may be coupled directly to the external storage 130.

(4) The new virtual storage 110 receives from the management server 160 the following information with respect to the each of the recognized external LU:

(a) whether or not the capacity virtualization function is being applied to the external LU; and (b) which virtual storage 110 comprises the external LU control authority with respect to the external LU for which the capacity virtualization function is being applied. Based on this information, the new virtual shortage 110 updates the external LU information 240 corresponding to the recognized external LU.

(5) The new virtual storage 110 comprises an internal volume 210. In addition, the new virtual storage 110, based on information from the management server 160, configures the information required in the internal capacity pool information 230.

When the above-mentioned preparations are complete, a migration from the old virtual storage 110 to the host LU of the new virtual storage 110 is started. The capacity virtualization function may be applied respectively to all the host LUs defined in the old virtual storage 110, or the capacity virtualization function may be applied to a portion of the host LUs thereof.

The management server 160 recognizes the migration-source host LU defined in the old virtual storage 110, defines a migration-destination host LU in the new virtual storage 110, and causes either the migration-source virtual storage 110 or the migration-destination virtual storage 110 to execute the migration of data from the migration-source host LU to the migration-destination host LU.

Embodiment 3 is a case in which Embodiment 1 has been applied to the host LU migration scheme.

In Embodiment 3, when the host LU is migrated from the old virtual storage (the migration-source virtual storage) 110 to the new virtual storage (the migration-destination virtual storage) 110, the old virtual storage 110 executes the control over the migration process. Furthermore, the host 100 will issue a read/write request to the old virtual storage 110 while the migration process is in progress.

In Embodiment 3, the management server 160 recognizes the host LU defined in the old virtual storage 110, and decides on a host LU to be migrated. Upon making the decision, the management server 160 sends the identifier of the migration-source host LU, the identifier of the new virtual storage 110, and the identifier of the migration-destination host LU to the old virtual storage 110. Furthermore, the management server 160 sends the identifier of the old virtual storage 110, the identifier of the migration-source host LU, the identifier of the migration-destination host LU, and the virtual capacity of the migration-source host LU to the new virtual storage 110.

Thereafter, the processing that has been explained in Embodiment 1 is carried out, and a data migration from the migration-source host LU to the migration-destination host LU is completed. Furthermore, the control authority for the external LU may also be migrated as needed at this time.

When this processing is complete, the management server 160 checks whether the migrations of all the host LUs of the old virtual storage 110 have been completed. Furthermore, in a case where there is a host LU for which migration has not been completed, the management server 160 decides all the host LUs to be migrated and causes the above processing to be executed. When the migration of all the host LUs is complete, the management server 160 ends the processing. The old virtual storage 110 may determine whether or not data migration has been completed for all of the host LUs, and in a case where the result of this determination is negative, may carry out a data migration with respect to the host LU(s) for which data migration has not been done.

Embodiment 4

Embodiment 4 is a case in which Embodiment 2 has been applied to the host LU migration scheme.

In Embodiment 4, when a host LU is migrated from the old virtual storage (the migration-source virtual storage) 110 to the new virtual storage (the migration-destination virtual storage) 110, the new virtual storage 110 executes control over the migration process. Furthermore, the host 100 will issue a read/write request to the new virtual storage while the migration process is in progress.

In Embodiment 4, too, the management server 160 recognizes the host LU defined in the old virtual storage 110, and decides on a host LU to be migrated. Upon making the decision, the management server 160 sends the identifier of the migration-source host LU, the identifier of the new virtual storage 110, and the identifier of the migration-destination host LU to the old virtual storage 110. Furthermore, the management server 160 sends the identifier of the old virtual storage 110, the identifier of the migration-source host LU, the identifier of the migration-destination host LU, and the virtual capacity of the migration-destination host LU to the new virtual storage 110.

Furthermore, as was described in Embodiment 2, the management server 160, upon receiving the above-mentioned request receipt report from both the old virtual storage 110 and the new virtual storage, may request that the host 100 switch the address of the read/write request of the host LU that is the migration target to the new virtual storage 110.

By carrying out the same processing as that of Embodiment 2, the migration of the specified host LU is migrated as described hereinabove. Furthermore, the control authority of the external LU may also be migrated as needed at this time.

When this processing is complete, the management server 160 checks whether the migrations of all the host LUs of the old virtual storage 110 have been completed. Furthermore, in a case where there is a host LU for which migration has not been completed, the management server 160 may decide all the host LUs to be migrated and may cause the above processing to be executed. When the migration of all the host LUs is complete, the management server 160 ends the processing.

A number of embodiments of the present invention have been explained above, but these are examples for explaining the present invention, and do not purport to limit the scope of the present invention solely to these embodiments. The present invention can be put into practice in a variety of other modes.

REFERENCE SIGNS LIST

100 Host
110 Virtual storage
130 External storage

The invention claimed is:

1. A storage system comprising:
a first storage apparatus, and
a second storage apparatus, the first storage apparatus and second storage apparatus sharing an external volume, which is a logical volume provided by an external storage apparatus,
wherein:
the first storage apparatus comprises an external capacity pool, which is a storage area based on the external volume and is partitioned into multiple external pages that are sub-storage areas, and a first virtual volume, which is a virtual logical volume comprising multiple first virtual areas, and in a case of a write to a virtual area that has not been allocated a page, is configured to allocate an unallocated external page from the external capacity pool to the virtual area;
the second storage apparatus comprises a second virtual volume, which is a virtual logical volume comprising multiple second virtual areas; and
in a data migration from the first virtual volume to the second virtual volume, a data migration from a first virtual area to which an external page has been allocated to a second virtual area is completed in accordance with the following (a) and (b):
(a) the first storage apparatus notifies the second storage apparatus of a migration source address, which is an address of the first virtual area, and an external address, which is an address of an external page allocated to the first virtual area; and
(b) the second storage apparatus stores a corresponding relationship between the notified migration-source address and the notified external address; and
wherein one of the first storage apparatus and the second storage apparatus;
(c) receives a write request from a host;

(d) in a case where a page has not been allocated to a write-destination virtual area, which is a virtual area that belongs to an address specified in the write request from the host, and an external page is to be allocated to the virtual area, determines whether or not the one of the first storage apparatus and the second storage apparatus has an authority for allocating an external page;

(e) in a case where a result of the determination in (d) is affirmative, allocates an external page to the write-destination virtual area; and (f) in a case where a result of the determination in (d) is negative, sends an external page allocation request to the storage apparatus having the authority for allocating an external page.

2. The storage system according to claim 1, wherein the one of the first storage apparatus and the second storage apparatus:

(g) decides to release an external page;

(h) determines whether or not the one of the first storage apparatus and the second storage apparatus has an authority for releasing the external page;

(i) in a case where a result of the determination in (h) is affirmative, releases the external page; and (j) in a case where a result of the determination in (h) is negative, sends an external page release request to the storage apparatus having the authority for releasing the external page.

3. The storage system according to claim 1, wherein the one of the first storage apparatus and the second storage apparatus:

(k) determines whether or not to migrate either an external page allocation or a release authority to the other storage apparatus; and (l) in a case where a result of the determination in (k) is affirmative, migrates either the external page allocation or the release authority to the other storage apparatus.

4. The storage system according to claim 1, wherein in a data migration from the first virtual volume to the second virtual volume, the one of the first storage apparatus and the second storage apparatus:

(m) receives a read request from the host; and (n) reads data from a page allocated to a virtual area that belongs to an address specified in the read request, and sends the read data to the host.

5. The storage system according to claim 1, wherein the one of the first storage apparatus and the second storage apparatus has an internal capacity pool, which is a storage area based on a physical storage device of this storage apparatus, and which is partitioned into multiple internal pages that are sub-storage areas, and in the data migration from the first virtual volume to the second virtual volume:

(o) receives a second write request from the host;

(p) determines whether or not a page has been allocated to a write-destination virtual area, which is a virtual area that belongs to an address specified in the second write request;

(q) in a case where a result of the determination in (p) is negative, determines whether to allocate an external page or a virtual page; and (r) allocates a page in accordance with the determination in (q).

6. The storage system according to claim 5, wherein the first storage apparatus:

(s) determines whether or not the data migration has been completed with respect to the write-destination virtual area; and (t) in a case where a result of the determination in (s) is affirmative, and a page has been allocated to the write-destination virtual area, writes write-target data that conforms to the write request from the host to the page allocated to the write-destination virtual area, and sends the write-target data to the second storage apparatus.

7. The storage system according to claim 1, wherein, in the data migration from the first virtual volume to the second virtual volume, the second storage apparatus:

(u) receives a read request from the host;

(v) determines whether or not a read-source virtual area, which is a virtual area that conforms to an address specified in the read request, is a virtual area for which a data migration has been completed; and (w) in a case where a result of the determination in (v) is affirmative, reads data from the page allocated to the read-source virtual area, and sends the read data to the host.

8. The storage system according to claim 1, wherein:
the first storage apparatus is an existing storage apparatus, and
the second storage apparatus is a newly provided storage apparatus.

9. The storage system according to claim 1, wherein the second storage apparatus, upon receiving an access request specifying an access-destination address, which is an address of a second virtual area in the second virtual volume:

(x) in a case where the access-destination address is an address that conforms to the migration-source address, the second storage apparatus sends to the external storage apparatus an access request specifying an address that conforms to an external address corresponding to the migration-source address; and (y) in a case where the access-destination address is an address that does not conform to the migration-source address, the second storage apparatus sends to the first storage apparatus an external page allocation request, wherein the first storage apparatus decides on an unallocated external page in the external capacity pool in accordance with the external page allocation request and notifies the second storage apparatus of an external page address, which is an address of the decided external page, and the second storage apparatus stores a corresponding relationship between the access-destination address and the notified external page address, and sends to the external storage apparatus an access request specifying an address that conforms to this external page address.

10. The storage system according to claim 1, wherein:
the second storage apparatus has an authority for accessing an external page allocated to the second virtual volume, and
the first storage apparatus has an authority for allocating an external page to the second virtual volume.

11. The storage system according to claim 10, wherein, in a case where a load of the first storage apparatus is higher than a prescribed load, the authority for allocating an external page to the second virtual volume is migrated to the second storage apparatus.

12. A logical volume migration method, at a time of a data migration from a first virtual area, to which an external page has been allocated, to a second virtual area in a data migration from a first virtual volume to a second virtual volume, the logical volume migration method comprising steps of:

(a) by a first storage apparatus, notifying a second storage apparatus of a migration source address, which is an address of the first virtual area, and an external address, which is an address of an external page allocated to the first virtual area; and (b) by the second storage apparatus, storing a corresponding relationship between the notified migration source address and the notified external address, wherein:

the first storage apparatus and the second storage apparatus share an external volume, which is a logical volume provided by an external storage apparatus, the first storage apparatus comprises an external capacity pool, which is a storage area based on the external volume and is partitioned into multiple external pages that are sub-storage areas, and a first virtual volume, which is a virtual logical volume comprising multiple first virtual areas, and in a case of a write to a virtual area that has not been allocated a page, is configured to allocate an unallocated external page from the external capacity pool to the virtual area, the second storage apparatus comprises a second virtual volume, which is a virtual logical volume comprising multiple second virtual areas; and wherein one of the first storage apparatus and the second storage apparatus:

(c) receives a write request from a host;

(d) in a case where a page has not been allocated to a write-destination virtual area, which is a virtual area that belongs to an address specified in the write request from the host, and an external page is to be allocated to the virtual area, determines whether or not the one of the first storage apparatus and the second storage apparatus has an authority for allocating an external page;

(e) in a case where a result of the determination in (d) is affirmative, allocates an external page to the write-destination virtual area; and (f) in a case where a result of the determination in (d) is negative, sends an external page allocation request to the storage apparatus having the authority for allocating an external page.

13. The logical volume migration method according to claim 12, wherein the one of the first storage apparatus and the second storage apparatus:

(g) decides to release an external page;

(h) determines whether or not the one of the first storage apparatus and the second storage apparatus has an authority for releasing the external page;

(i) in a case where a result of the determination in (h) is affirmative, releases the external page; and (j) in a case where a result of the determination in (h) is negative, sends an external page release request to the storage apparatus having the authority for releasing the external page.

14. The logical volume migration method according to claim 12, wherein the one of the first storage apparatus and the second storage apparatus:

(k) determines whether or not to migrate either an external page allocation or a release authority to the other storage apparatus; and (l) in a case where a result of the determination in (k) is affirmative, migrates either the external page allocation or the release authority to the other storage apparatus.

15. The logical volume migration method according to claim 12, wherein in the data migration from the first virtual volume to the second virtual volume, one of the first storage apparatus and the second storage apparatus:

(m) receives a read request from the host; and (n) reads data from a page allocated to a virtual area that belongs to an address specified in the read request, and sends the read data to the host.

16. The logical volume migration method according to claim 12, wherein the one of the first storage apparatus and the second storage apparatus has an internal capacity pool, which is a storage area based on a physical storage device of the storage apparatus, and which is partitioned into multiple internal pages that are sub-storage areas, and in the data migration from the first virtual volume to the second virtual volume:

(o) receives a write request from the host;

(p) determines whether or not a page has been allocated to a write-destination virtual area, which is a virtual area that belongs to an address specified in the write request;

(q) in a case where a result of the determination in (p) is negative, determines whether to allocate an external page or a virtual page; and (r) allocates a page in accordance with the determination in (q).

17. The logical volume migration method according to claim 16, wherein the first storage apparatus:

(s) determines whether or not the data migration has been completed with respect to the write-destination virtual area; and (t) in a case where a result of the determination in (s) is affirmative, and a page has been allocated to the write-destination virtual area, writes write-target data that conforms to the write request to the page allocated to the write-destination virtual area, and sends the write-target data to the second storage apparatus.

18. The logical volume migration method according to claim 12, wherein, in the data migration from the first virtual volume to the second virtual volume, the second storage apparatus:

(u) receives a read request from the host;

(v) determines whether or not a read-source virtual area, which is a virtual area that conforms to an address specified in the read request, is a virtual area for which the data migration has been completed; and (w) in a case where a result of the determination in (v) is affirmative, reads data from the page allocated to the read-source virtual area, and sends the read data to the host.

19. The logical volume migration method according to claim 12, wherein:

the first storage apparatus is an existing storage apparatus, and the second storage apparatus is a newly provided storage apparatus.

20. The logical volume migration method according to claim 12, wherein the second storage apparatus, upon receiving an access request specifying an access-destination address, which is an address of a second virtual area in the second virtual volume:

(x) in a case where the access-destination address is an address that conforms to the migration-source address, the second storage apparatus sends an access request specifying an address that conforms to an external address corresponding to the migration-source address to the external storage apparatus; and (y) in a case where the access-destination address is an address that does not conform to the migration-source address, the second storage apparatus sends to the first storage apparatus an external page allocation request, the first storage apparatus decides on an unallocated external page in the external capacity pool in accordance with the external page allocation request and notifies the second storage apparatus of an external page address, which is an address of the decided external page, and the second storage apparatus stores a corresponding relationship between the access-destination address and the notified external page address, and sends to the external storage apparatus an access request specifying an address that conforms to the external page address.

21. The logical volume migration method according to claim 12, wherein:
the second storage apparatus has an authority for accessing an external page allocated to the second virtual volume, and
the first storage apparatus has an authority for allocating an external page to the second virtual volume.

22. The logical volume migration method according to claim 21, wherein, in a case where a load of the first storage apparatus is higher than a prescribed load, the authority for allocating an external page to the second virtual volume is migrated to the second storage apparatus.

* * * * *